US012216426B2

(12) United States Patent
Matsuura

(10) Patent No.: US 12,216,426 B2
(45) Date of Patent: Feb. 4, 2025

(54) IMAGE FORMING APPARATUS CONTROLLING FORMATION OF TEST IMAGES BASED ON RECORDING MATERIAL TYPE

(71) Applicant: CANON KABUSHIKI KAISHA, Tokyo (JP)

(72) Inventor: Taisuke Matsuura, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/243,451

(22) Filed: Sep. 7, 2023

(65) Prior Publication Data

US 2023/0418200 A1 Dec. 28, 2023

Related U.S. Application Data

(62) Division of application No. 17/961,850, filed on Oct. 7, 2022, now Pat. No. 11,796,951.

(30) Foreign Application Priority Data

Oct. 22, 2021 (JP) ................................ 2021-173542

(51) Int. Cl.
*G03G 15/16* (2006.01)
*G03G 15/00* (2006.01)

(52) U.S. Cl.
CPC ..... *G03G 15/5062* (2013.01); *G03G 15/1675* (2013.01); *G03G 2215/00067* (2013.01)

(58) Field of Classification Search
CPC ........... G03G 15/5029; G03G 15/5062; G03G 15/1675; G03G 15/5054; G03G 15/5058; G03G 2215/00067; G06K 15/027
USPC ...................................................... 399/49, 72
See application file for complete search history.

(56) References Cited

U.S. PATENT DOCUMENTS

| | | | | |
|---|---|---|---|---|
| 7,003,237 | B2 | 2/2006 | Miyamoto et al. | |
| 8,843,003 | B2 | 9/2014 | Nakao | |
| 11,195,068 | B2 | 12/2021 | Omata | |
| 2004/0184830 | A1 | 9/2004 | Miyamoto et al. | |
| 2020/0242428 | A1 * | 7/2020 | Omata | G06K 15/021 |
| 2022/0253005 | A1 | 8/2022 | Matsuura | |
| 2022/0317599 | A1 | 10/2022 | Matsuura | |

FOREIGN PATENT DOCUMENTS

| | | | |
|---|---|---|---|
| JP | 2004-280003 | A | 10/2004 |
| JP | 2012-123309 | A | 6/2012 |
| JP | 2013-037185 | A | 2/2013 |
| JP | 2018-004828 | A | 1/2018 |

* cited by examiner

*Primary Examiner* — Hoang X Ngo
(74) *Attorney, Agent, or Firm* — Venable LLP

(57) ABSTRACT

An image forming apparatus includes an image bearing member, an image forming portion, a transfer member, an applying portion, and an executing portion configured to execute an output operation for forming and outputting a chart formed on a recording material on which a plurality of test images are transferred by applying a plurality of voltages to the transfer member by the applying portion. The executing portion changes a change width per level of the test voltage so that the change width is a first change width in a case that a material of the recording material on which the chart is formed is a first material and so that the change width is a second change width different from the first change width in a case that the material of the recording material is a second material different from the first material.

14 Claims, 16 Drawing Sheets

| | | AMBIENT WATER CONTENT(g/kg/≤) | | | | |
|---|---|---|---|---|---|---|
| | | ≤0.9 | ··· | 8.9 | ··· | 21.5≤ |
| BASIS WEIGHT (g/m²) | · | · | | · | | · |
| | · | · | | · | | · |
| | 81~100 | 1000V | ··· | 500V | ··· | 200V |
| | 101~125 | 1150V | ··· | 600V | ··· | 250V |
| | 126~150 | 1300V | ··· | 700V | ··· | 300V |
| | · | · | | · | | · |
| | · | · | | · | | · |

Fig. 5

IMAGE FORMING APPARATUS CONTROLLING FORMATION OF TEST IMAGES BASED ON RECORDING MATERIAL TYPE

FIELD OF THE INVENTION AND RELATED ART

The present invention relates to an image forming apparatus such as a copying machine, a printer, or a facsimile machine, of an electrophotographic type or an electrostatic recording type.

In the image forming apparatus of the electrophotographic type, a toner image formed on an image bearing member such as a photosensitive member or an intermediary transfer member is transferred onto a recording material. This transfer of the toner image from the image bearing member onto the recording material is carried out in many cases by applying a transfer voltage to a transfer member such as a transfer roller forming a transfer portion in contact with the image bearing member. In the image forming apparatus of an intermediary transfer type, the toner image formed on a first image bearing member such as a photosensitive drum is primary-transferred onto a second image bearing member such as an intermediary transfer belt and thereafter is secondary-transferred onto the recording material. According to the intermediary transfer type, formation of images on various recording materials becomes easy, and therefore, selectivity of the recording material can be enhanced.

The transfer voltage can be determined on the basis of a transfer portion part voltage corresponding to the electrical resistance of the transfer portion detected in a pre-rotation process before image formation or in the like step, and a recording material part voltage depending on a kind of recording material set in advance. By this, an appropriate transfer voltage can be set according to environment fluctuations, transfer member usage history, the kind of the recording material, and the like.

However, there are various kinds of the recording materials used in image formation, and therefore, at a recording material part voltage of a preset representative recording material, a resultant transfer voltage may be higher or lower than the appropriate transfer voltage. In the case where the voltage outputted at the transfer portion is not appropriate for the recording material, an image defect such as a poor image density or white void is liable to occur. Therefore, it is proposed that an operation in an adjustment mode in which a set value of the transfer voltage is adjusted depending on the recording material actually used in the image formation is performed in the image forming apparatus.

Japanese Laid-Open Patent Application No. 2013-37185 proposes an image forming apparatus operable in an adjustment mode for adjusting the set value of the secondary transfer voltage. In the operation in this adjustment mode, a chart on which a plurality of patches (test images, patch images, pattern images) is formed on a single recording material is outputted while switching the secondary transfer voltage for each patch. Then, a transfer property of each patch is checked by eye observation, and an optimum secondary transfer voltage condition is selected. Or, on the basis of a result that an image density of each patch is detected (read) by a reading apparatus, the optimum secondary transfer voltage condition is automatically selected.

However, in the operation in the above-described conventional adjusting mode, it turned out that the following problem arises.

That is, during output of the chart in the operation in the adjusting mode, a plurality of patches are transferred onto the recording material while switching the transfer voltage. In order to select an optimum transfer voltage set value on the basis of a patch transfer property, a value of the transfer voltage applied during the transfer of the patches may desirably be switched over the following range. That is, it is desired that a transfer current value corresponding to the value of the applied transfer voltage is changed from a current value range before a patch transfer property is obtained to a current value range after the patch transfer property is obtained. However, as regards an electric resistance value of the recording material used for outputting the chart, there are various electric resistance values from a lowest electric resistance value to a highest electric resistance value. Here, in an operation in a conventional adjusting mode, in general, even in the case where the electric resistance value of the recording material is different, the transfer voltage when the plurality of patches are transferred is switched with the same transfer voltage switching width. For that reason, the transfer current value changed within the surface of the recording material used for outputting the chart is largely different between the case where the recording material is low in electric resistance value and the case where the recording material is high in electric resistance value.

Incidentally, JP-A 2013-37185 discloses that as a reference of the transfer voltage which is a standard determined depending on a thickness of the recording material, a transfer voltage increased by each predetermined rate is applied and a chart is outputted. However, the electric resistance value of the recording material largely changes due to a factor, other than the thickness, such as a material or the like of the recording material in some instances, so that the above-described method cannot meet such a case in some instances.

SUMMARY OF THE INVENTION

A principal object of the present invention is to provide an image forming apparatus capable of setting an appropriate transfer voltage by changing a transfer current within an appropriate range in a chart irrespective of a recording material used for outputting the chart.

This object has been accomplished by the image forming apparatus according to the present invention.

According to an aspect of the present invention, there is provided an image forming apparatus comprising: an image bearing member configured to bear a toner image; an image forming portion configured to form the toner image on the image bearing member; a transfer member forming a transfer portion where the toner image is transferred from the image bearing member onto a recording material; an applying portion configured to apply a voltage to the transfer member; and an executing portion configured to execute an output operation for forming and outputting a chart formed on a recording material on which a plurality of test images are transferred by applying a plurality of voltages to the transfer member by the applying portion, wherein the executing portion changes a change width per level of the test voltage so that the change width is a first change width in a case that a material of the recording material on which the chart is formed is a first material and so that the change width is a second change width different from the first change width in a case that the material of the recording material is a second material different from the first material.

According to another aspect of the present invention, there is provided an image forming apparatus comprising: an image bearing member configured to bear a toner image; an image forming portion configured to form the toner image on the image bearing member; a transfer member configured to form a transfer portion where the toner image is transferred from the image bearing member onto a recording material; an applying portion configured to apply a voltage to the transfer member; an executing portion configured to execute an output operation for forming and outputting a chart formed on a recording material on which a plurality of test images are transferred by applying a plurality of voltages to the transfer member by the applying portion; and an acquiring portion configured to acquire information on a material of the material on which the chart is formed, wherein the executing portion is capable of changing a change width per level of the test voltage on the basis of the information.

Further features of the present invention will become apparent from the following description of exemplary embodiments with reference to the attached drawings.

BRIEF DESCRIPTION OF THE DRAWINGS

FIG. 5 is a table showing an example of table data of recording material part voltage 3.

Figure 6:
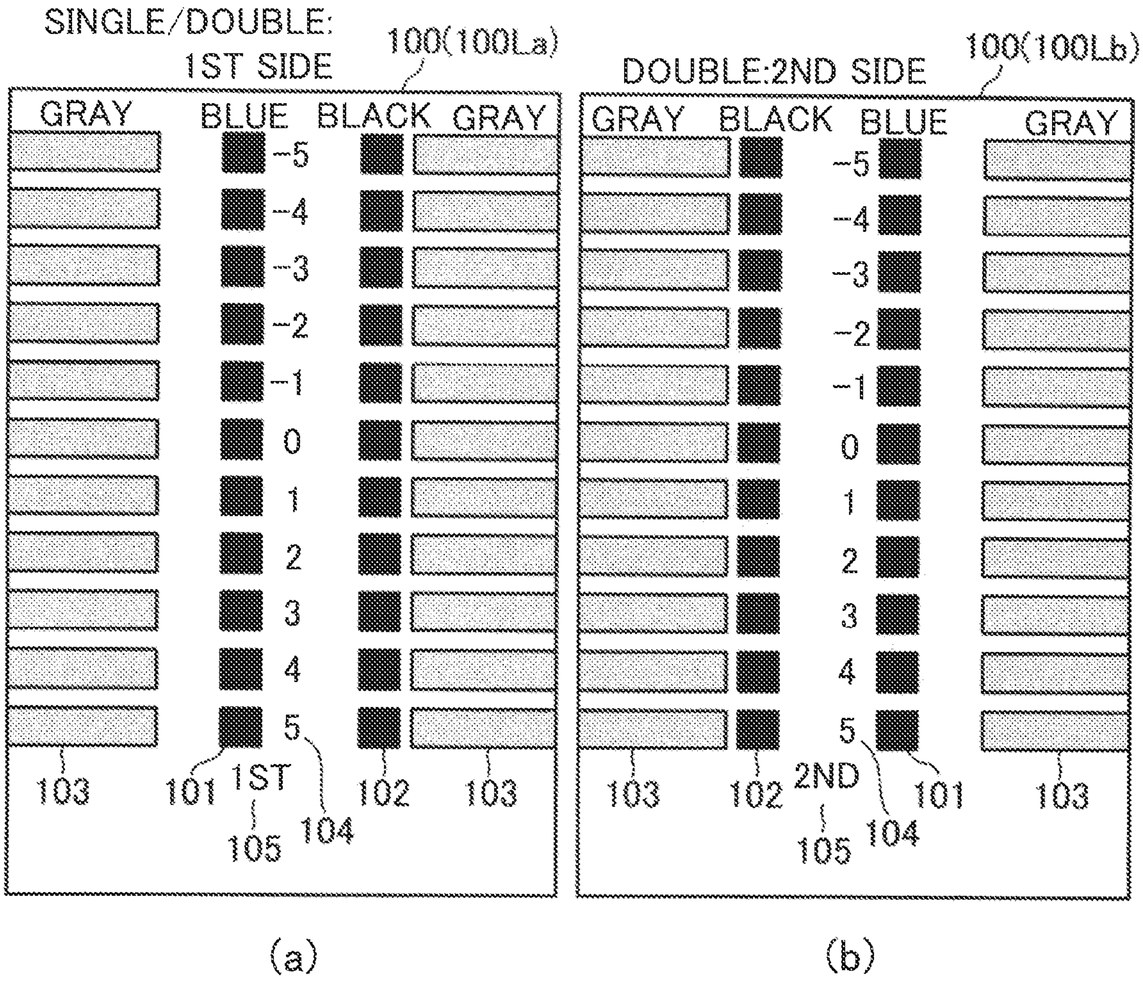

Parts (a) and (b) of FIG. 6 are views of charts each outputted in an operation in an adjustment mode.

Figure 7:
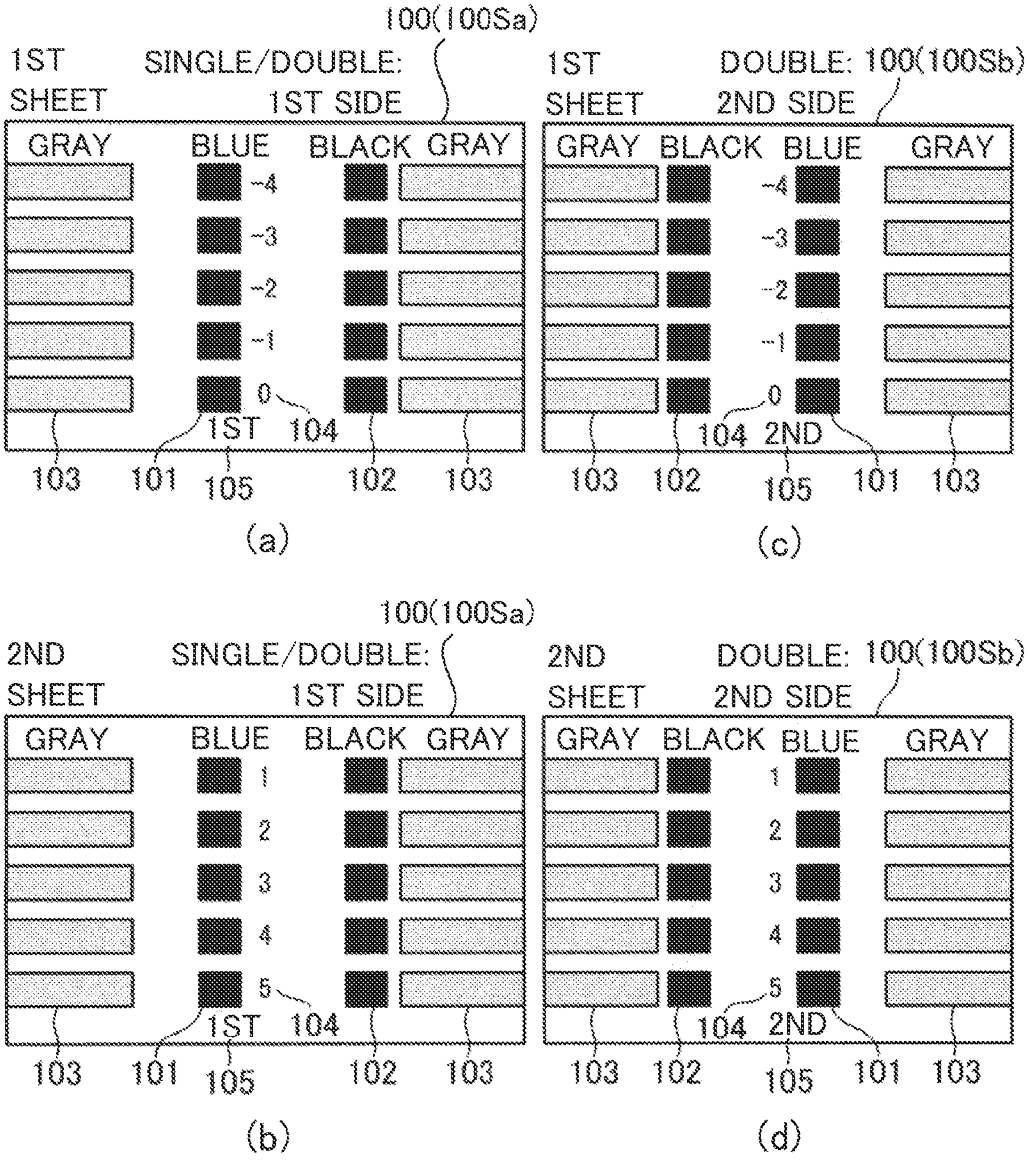

Parts (a) to (d) of FIG. 7 are views of charts each outputted in an operation in an adjustment mode.

Figure 8:
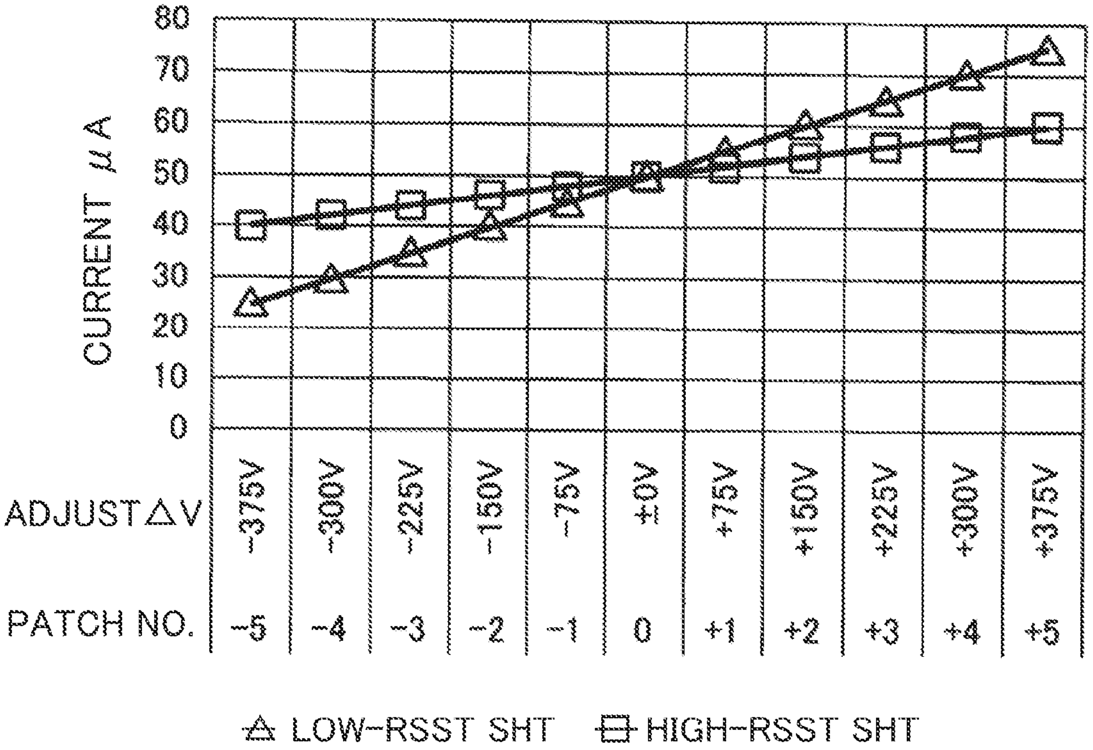

FIG. 8 is a graph showing an example of a transfer current value for a patch in the case where recording materials different in electric resistance value are used.

Figure 9:
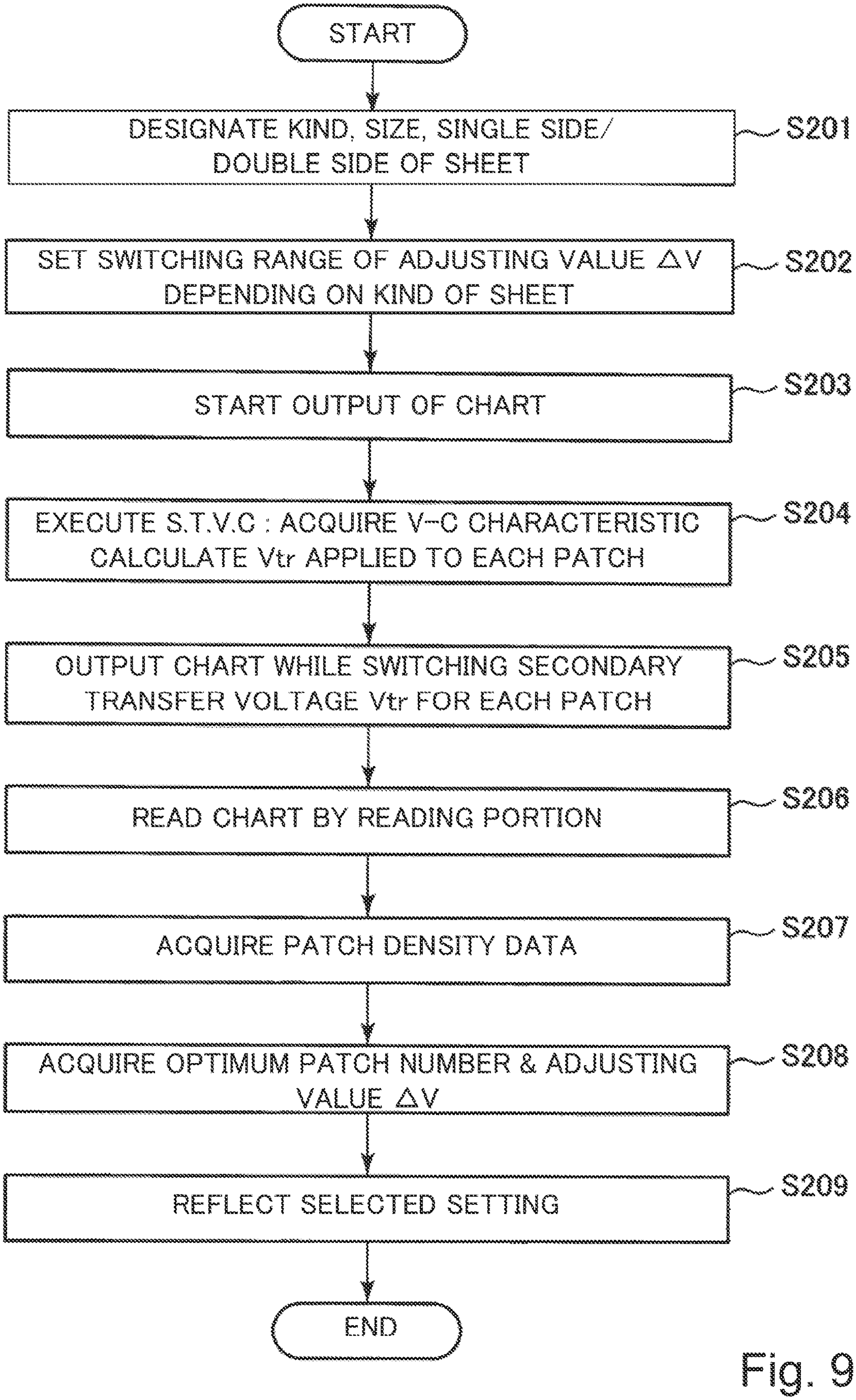

FIG. 9 is a flowchart showing an example of a procedure of an operation in an adjusting mode.

Figure 10:
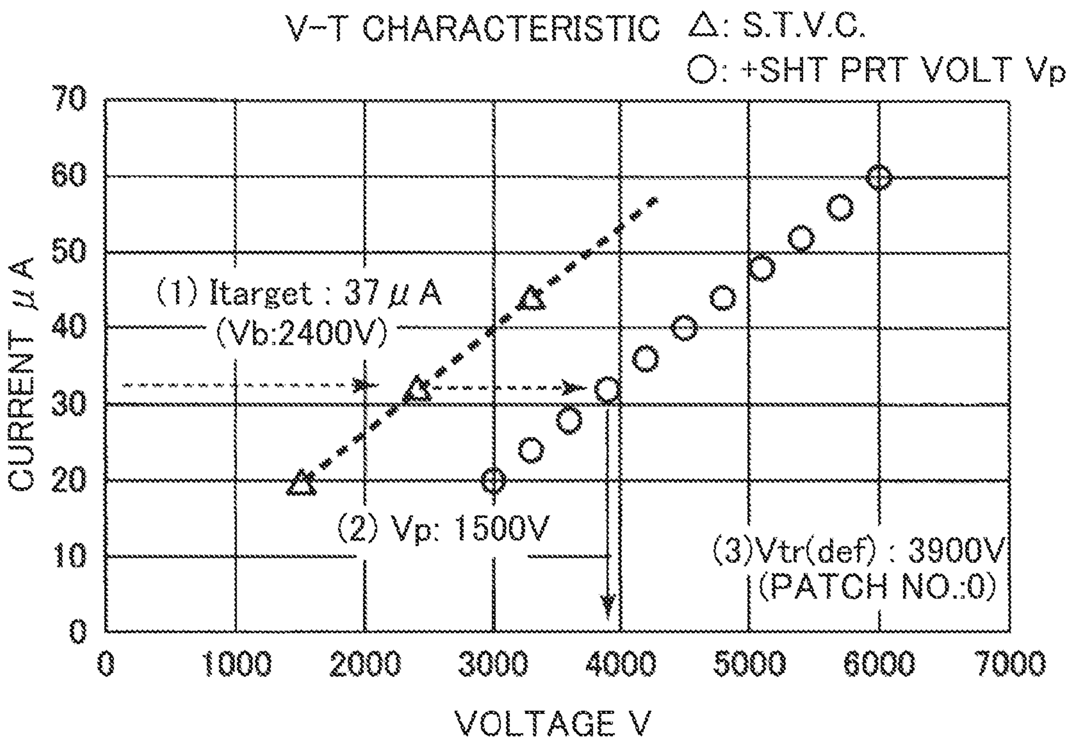

FIG. 10 is a graph for illustrating a calculating method of a secondary transfer voltage applied to a patch.

Figure 11:
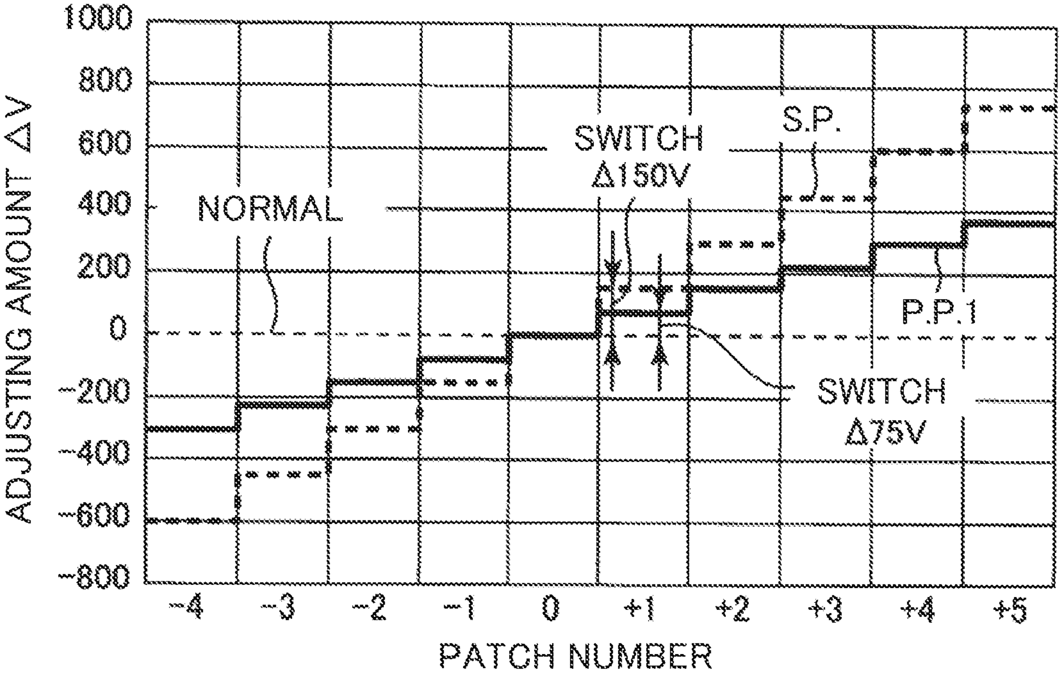

FIG. 11 is a graph for illustrating a switching width of the secondary transfer voltage depending on a kind of a recording material.

Figure 12:
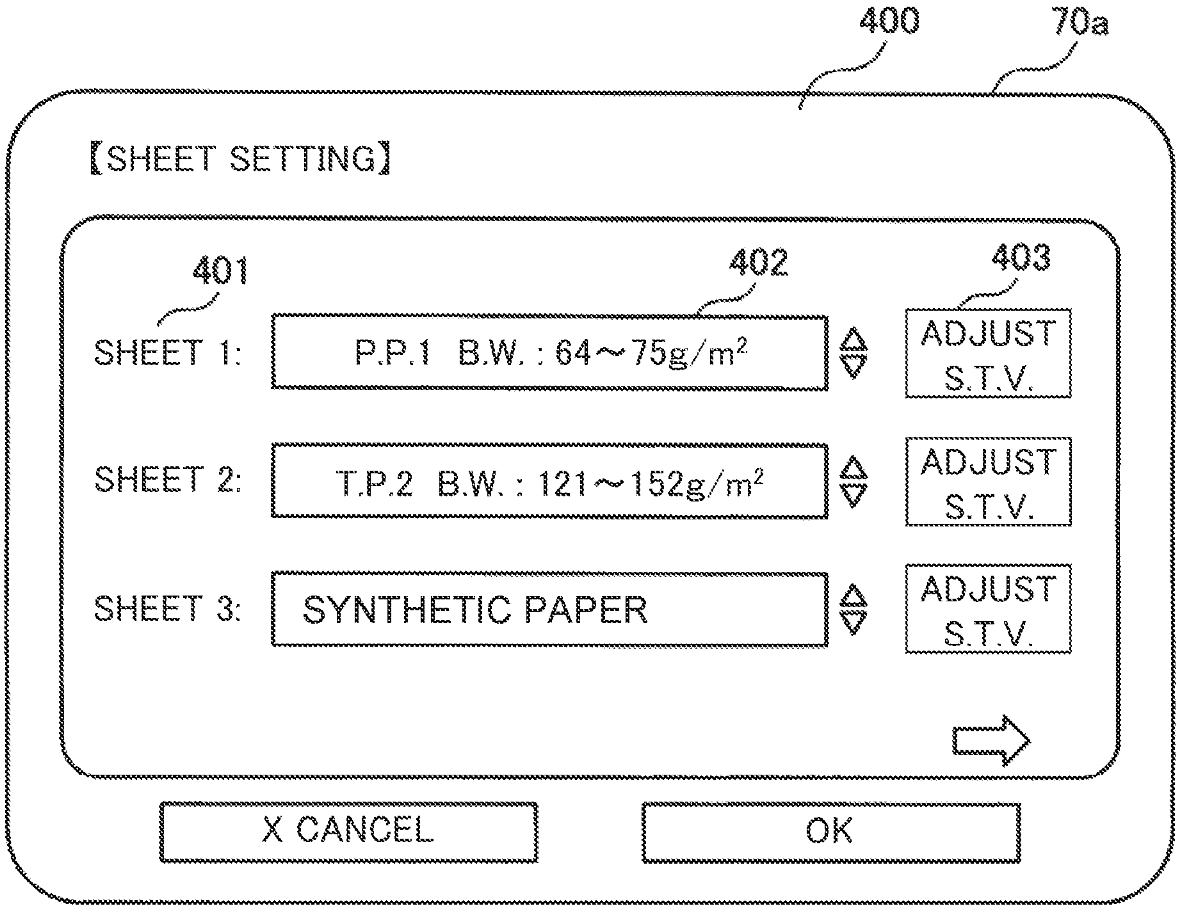

FIG. 12 is a view showing an example of a setting screen.

Figure 13:
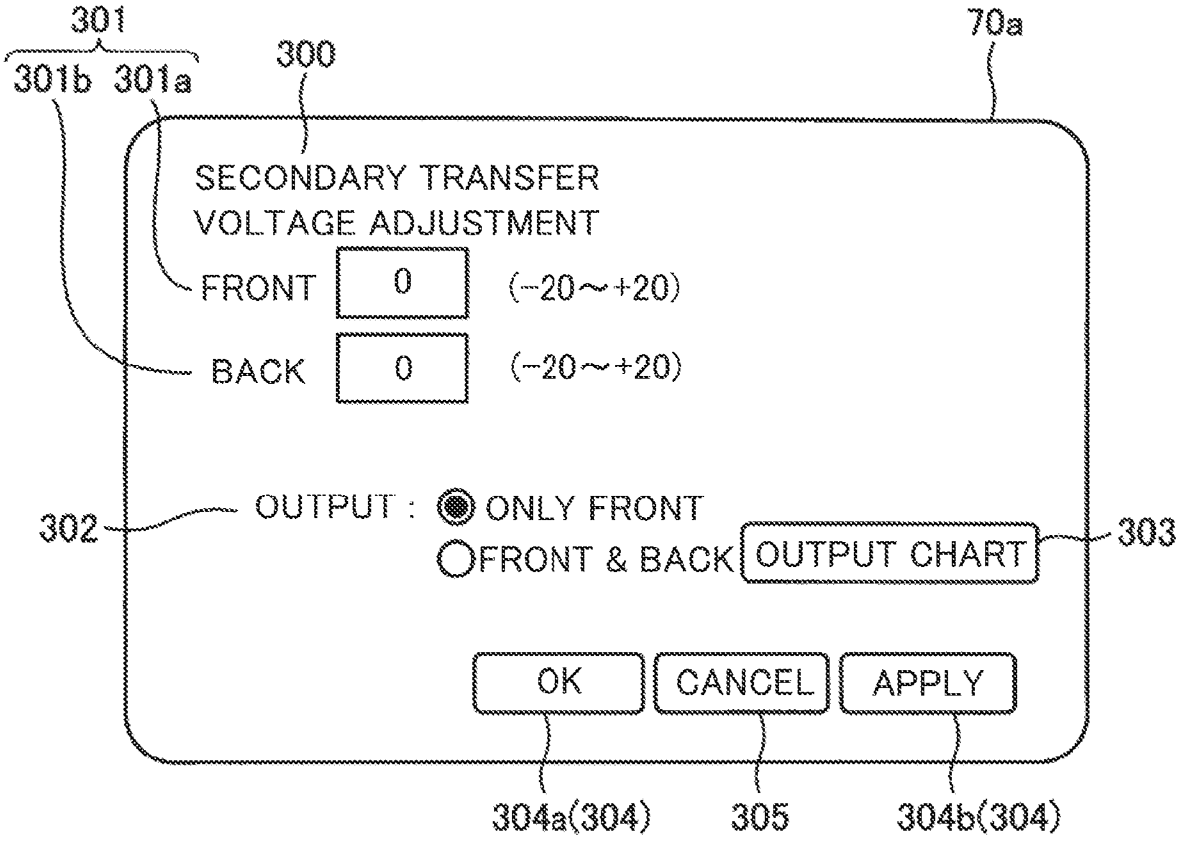

FIG. 13 is a view showing an example of a setting screen in an operation in an adjusting mode.

Figure 14:
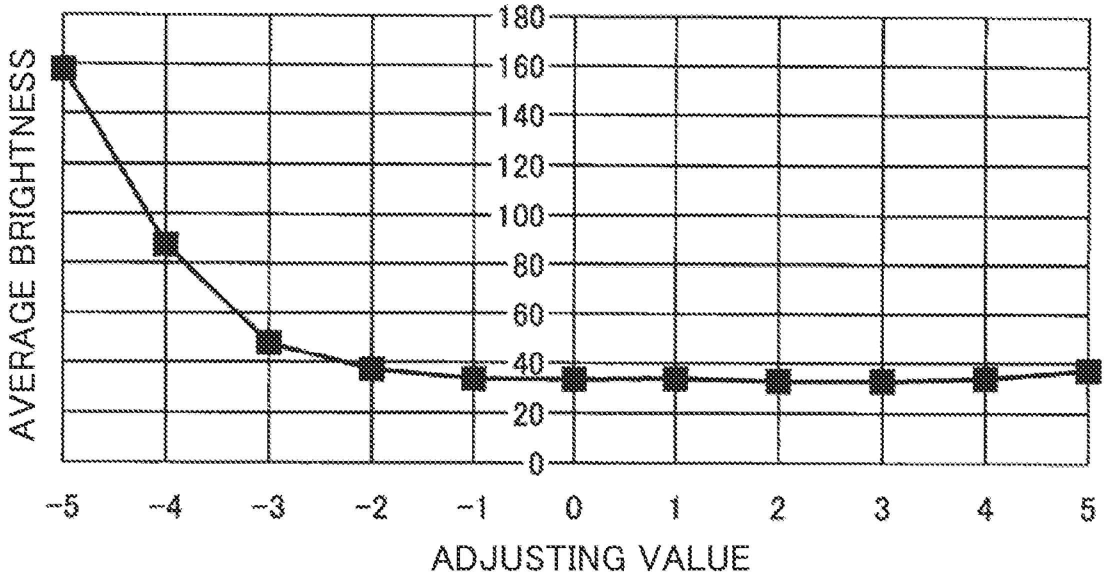

FIG. 14 is a graph showing an example of a reading result of a chart.

Figure 15:
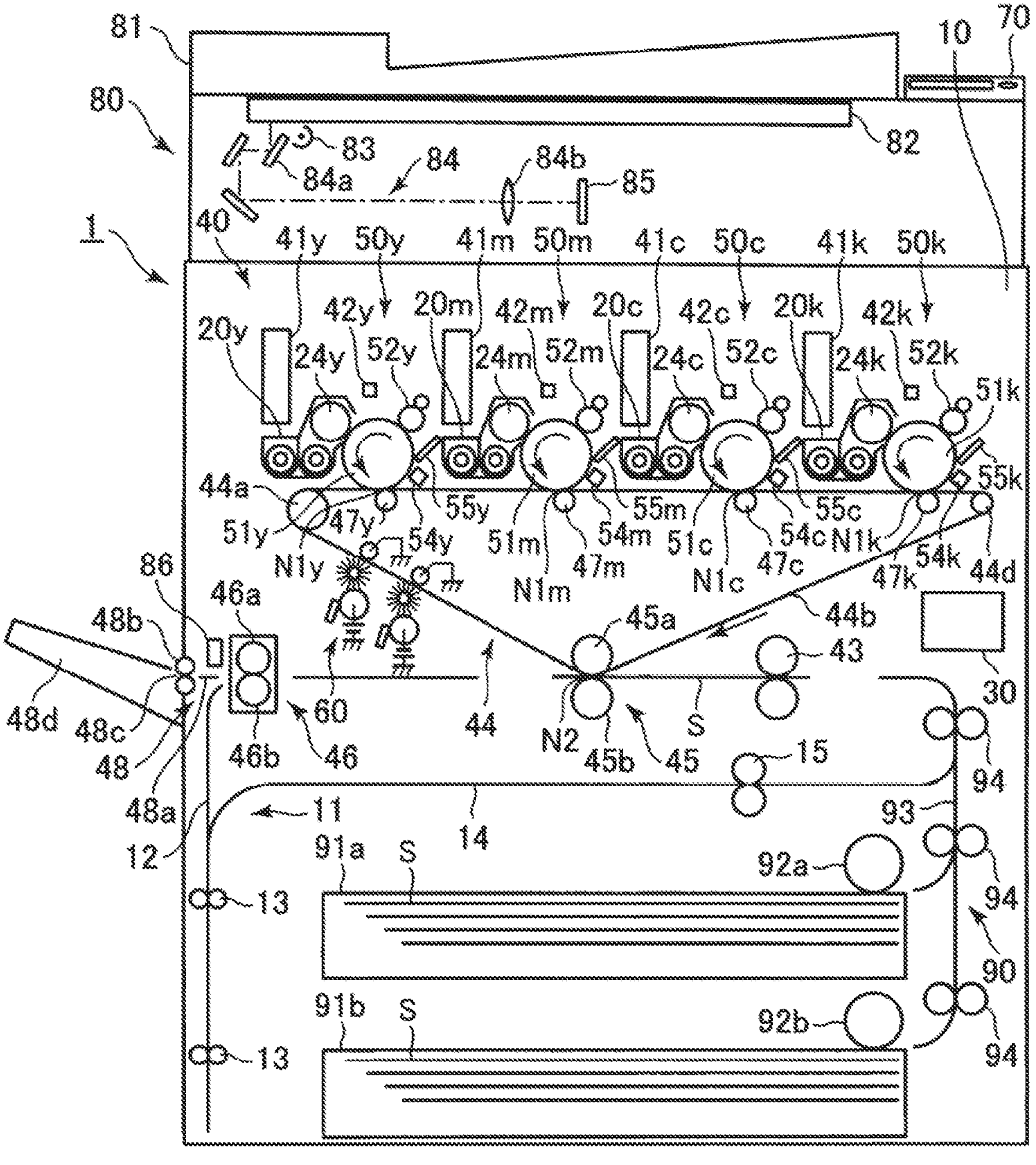

FIG. 15 is a schematic sectional view of an image forming apparatus of another example.

Figure 16:
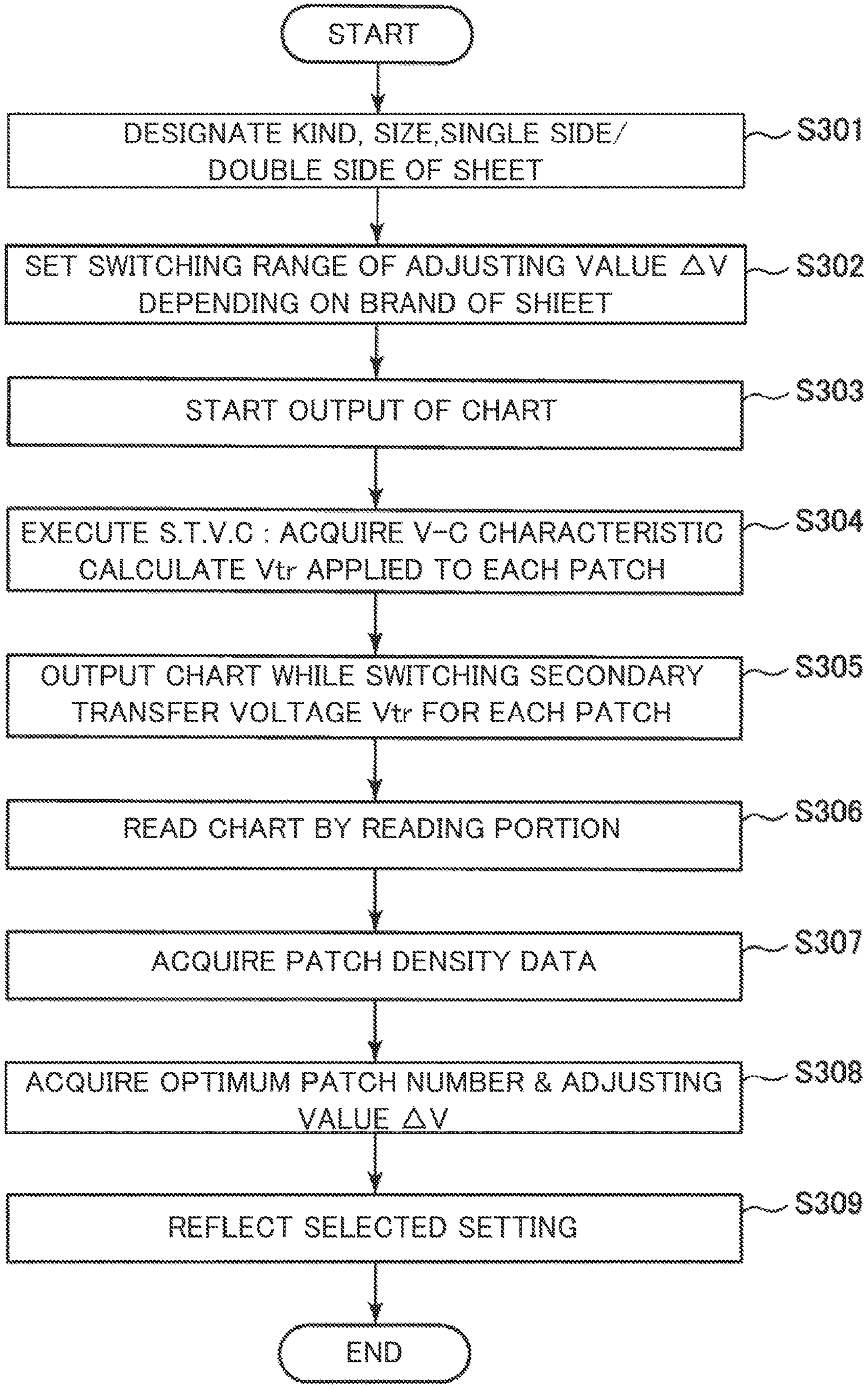

FIG. 16 is a flowchart showing a procedure of an operation in an adjusting mode in another embodiment.

DESCRIPTION OF EMBODIMENTS

In the following, the image forming apparatus according to the present invention will be described in more detail with reference to the drawings.

Embodiment 1

1. Structure and Operation of Image Forming Apparatus

Figure 1:
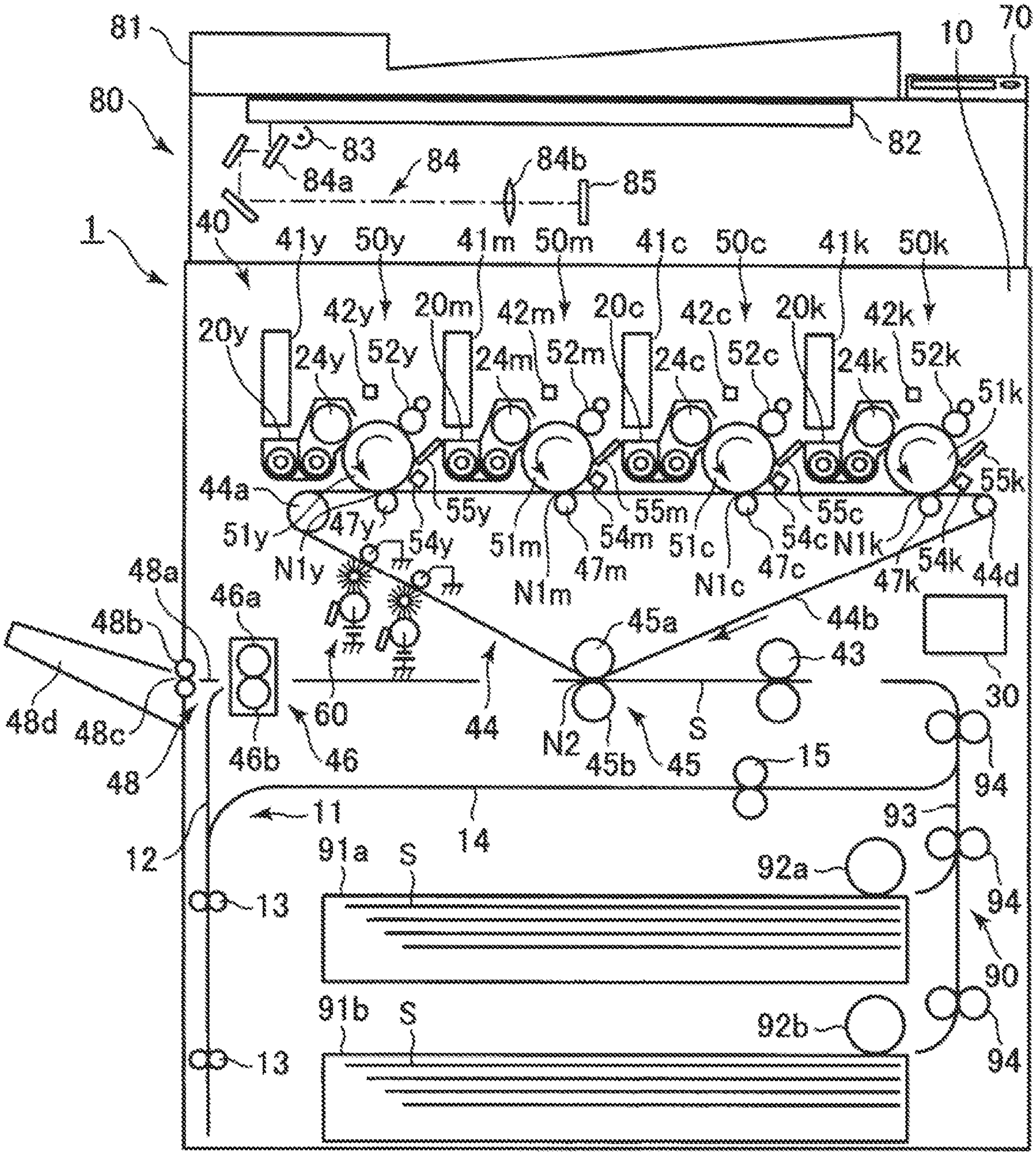
FIG. 1 is a schematic sectional view of an image forming apparatus.

FIG. 1 is a schematic cross-sectional view of an image forming apparatus 1 of this embodiment. The image forming apparatus 1 of this embodiment is a tandem type multifunction machine (having functions of a copying machine, a printer, and a facsimile machine) capable of forming a full-color image by using an electrophotographic type system and employing an intermediary transfer type system.

Figure 2:
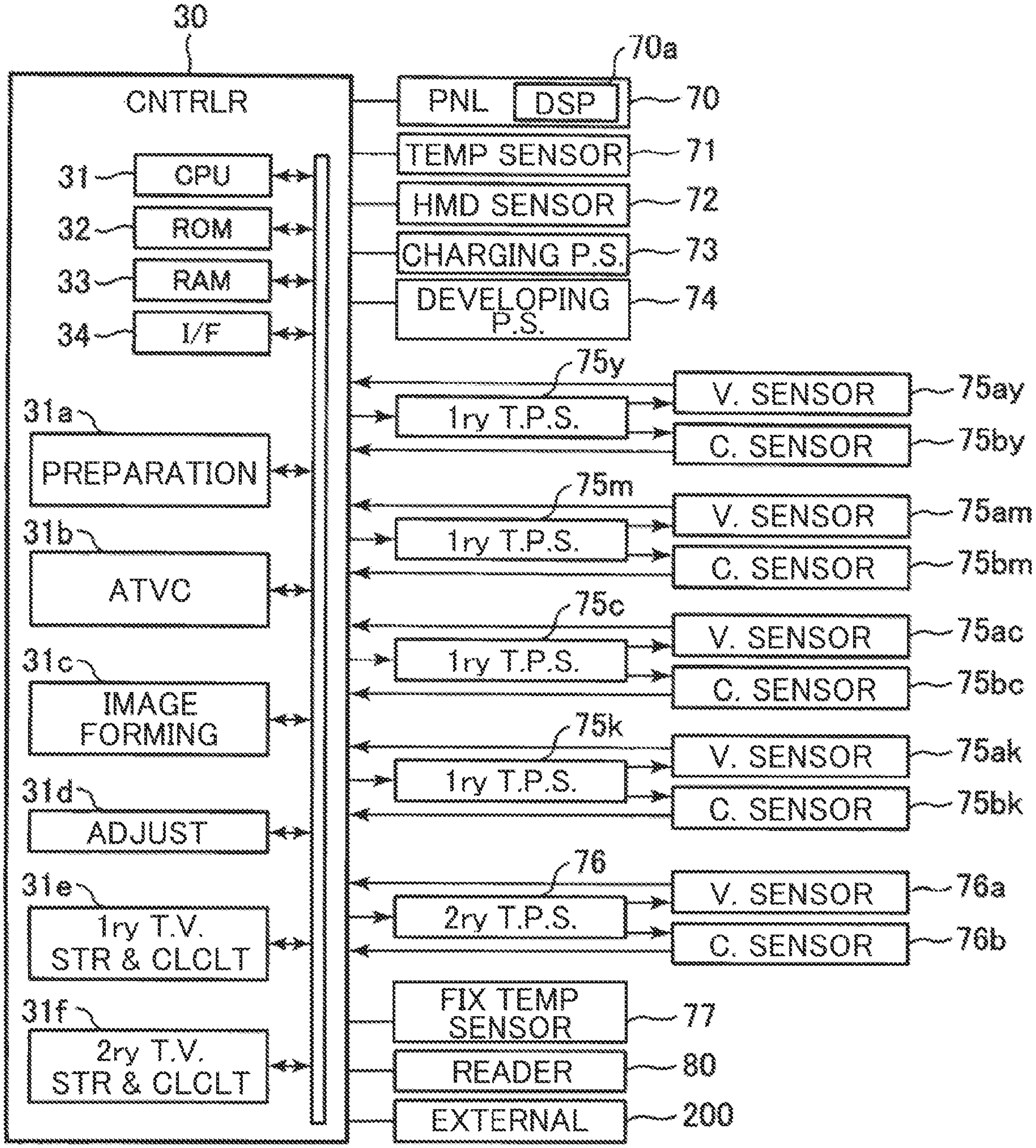
FIG. 2 is a block diagram showing a control system of the image forming apparatus.

As shown in FIG. 1, the image forming apparatus 1 includes an apparatus main assembly 10, a reading portion (reading device) 80, a feeding portion 90, a printer portion 40, a discharging portion 48, a controller 30, an operation portion 70, and the like. Further, inside the apparatus main assembly 10, as an environment detecting means, a temperature sensor 71 (FIG. 2) capable of detecting a temperature inside the apparatus and a humidity sensor 72 (FIG. 2) capable of detecting a humidity inside the apparatus are provided. The environment detecting means may be one capable of detecting at least one of the temperature and the humidity on at least one of the inside and the outside of the image forming apparatus 1. The image forming apparatus 1 can form four-color-based full-color image on recording material (sheet, transfer material, recording medium, media) S, in accordance with image information (image signals) supplied from the reading portion 80 or an external device 200 (FIG. 2). As the external device 200, it is possible to cite, for example, a host device, such as a personal computer, or a digital camera or a smartphone. Incidentally, the recording material S is a material on which a toner image is formed, and specific examples thereof include plain paper, synthetic resin sheets which are substitutes for plain paper, thick paper, and overhead projector sheets.

The printer portion 40 can form the image on the recording material S fed from the feeding portion (feeding device 90) on the basis of the image information. The printer portion 40 includes four image forming units 50*y*, 50*m*, 50*c*, 50*k*, as a plurality of image forming portions, four toner bottles 41*y*, 41*m*, 41*c*, 41*k*, an intermediary transfer unit 44, a secondary transfer device 45, and a fixing portion 46. The image forming units 50*y*, 50*m*, 50*c* and 50*k* form yellow (Y), magenta (M), cyan (C), and black (K) images, respectively. Elements having the same or corresponding functions or structures provided for the respective colors will be collectively described by omitting suffixes y, m, c and k for representing elements for associated colors, respectively, in some instances. Incidentally, the image forming apparatus 1 can also form a single-color image such as a black image or a multi-color image by using the image forming unit 50 for a desired single color or some of the four image forming units 50.

The image forming unit 50 includes the following means. First, a photosensitive drum 51 which is a drum-type (cylindrical) photosensitive member (electrophotographic photosensitive member) as a first image bearing member is provided. In addition, a charging roller 52 which is a roller-type charging member is used as charging means. In addition, an exposure device 42 is provided as an exposure means. In addition, a developing device 20 is provided as developing means. In addition, a pre-exposure device 54 is provided as a charge eliminating means. In addition, a drum cleaning device 55 as a photosensitive member cleaning means is provided. The image forming unit 50 forms a toner image on the intermediary transfer belt 44*b* which will be described hereinafter. In the image forming unit 50, the photosensitive drum 51 and, as process means actable thereon, the charging roller 52, the developing device 20, and the drum cleaning device 55 are integrally assembled into a unit and constitute a process cartridge which can be mounted in and dismounted from the apparatus main assembly 10.

The photosensitive drum 51 is movable (rotatable) while carrying an electrostatic image (electrostatic latent image) or a toner image. In this embodiment, the photosensitive drum 51 is a negatively chargeable organic photosensitive member (OPC) having an outer diameter of 30 mm. The photosensitive drum 51 has an aluminum cylinder as a substrate and a surface layer formed on the surface of the substrate. In this embodiment, the surface layer includes three layers of an undercoat layer, a photocharge generation layer, and a charge transportation layer, which are applied and laminated on the substrate in the order named. When an image forming operation is started, the photosensitive drum 51 is a driven to a rotate in a direction indicated by an arrow (counterclockwise) in the figure at a predetermined process speed (circumferential speed) by a motor (not shown) as a driving means.

The surface of the rotating photosensitive drum 51 is uniformly charged to a predetermined polarity (negative in this embodiment) and a predetermined potential by the charging roller 52. In this embodiment, the charging roller 52 is a rubber roller which contacts the surface of the photosensitive drum 51 and which is rotated by the rotation of the photosensitive drum 51. The charging roller 52 is connected with a charging voltage source 73 (FIG. 2). The charging bias power source 73 applies a predetermined charging voltage (charging bias) to the charging roller 52 during the charging process.

The surface of the charged photosensitive drum 51 is scanned and exposed by the exposure device 42 in accordance with the image information, so that an electrostatic image is formed on the photosensitive drum 51. The exposure device 42 is a laser scanner in this embodiment. The exposure device 42 emits laser beam in accordance with separated color image information outputted from the controller 30, and scans and exposes the surface (outer peripheral surface) of the photosensitive drum 51.

The electrostatic image formed on the photosensitive drum 51 is developed (visualized) by supplying the toner thereto by the developing device 20, so that a toner image is formed on the photosensitive drum 51. In this embodiment, the developing device 20 accommodates, as a developer, a two-component developer comprising non-magnetic toner particles (toner) and magnetic carrier particles (carrier). The toner is supplied from the toner bottle 41 to the developing device 20. The developing device 20 includes a developing sleeve 24. The developing sleeve 24 is made of a nonmagnetic material such as aluminum or nonmagnetic stainless steel (aluminum in this embodiment). Inside the developing sleeve 24, a magnet roller, which is a roller-shaped magnet, is fixed and arranged so as not to rotate relative to a main body (developing container) of the developing device 20. The developing sleeve 24 carries a developer and conveys it to a developing region facing the photosensitive drum 51. A developing voltage source 74 (FIG. 2) is connected to the developing sleeve 24. The developing voltage source 74 applies a predetermined developing voltage (developing bias) to the developing sleeve 24 during a developing step. In this embodiment, on an exposed portion (image portion) of the photosensitive drum 51 lowered in absolute value of the potential by being exposed after being uniformly charged, the toner charged to the same polarity (negative in this embodiment) as the charge polarity of the photosensitive drum 51 is deposited (reverse development). In this embodiment, the normal charge polarity of the toner, which is the charging polarity of the toner during development, is negative.

An intermediary transfer unit 44 is arranged so as to face the four photosensitive drums 51*y*, 51*m*, 51*c* and 51*k*. The intermediary transfer unit 44 includes an intermediary transfer belt 44*b*, which is an intermediary transfer member constituted by an endless belt, as a second image bearing member. The intermediary transfer belt 44*b* is wound around, as a plurality of stretching rollers (supporting rollers), a driving roller 44*a*, a driven roller 44*d*, and an inner secondary transfer roller 45*a*, and is stretched by a predetermined tension. The intermediary transfer belt 44*b* is movable (rotatable) while carrying the toner image. The driving roller 44*a* is rotationally driven by a motor (not shown) as driving means. The driven roller 44*d* is a tension roller which controls the tension of the intermediary transfer belt 44*b* to be constant. The driven roller 44*d* is subjected to a force which pushes the intermediary transfer belt 44*b* from an inner peripheral surface side toward an outer peripheral surface side by an urging force of a tension spring (not shown) which is an urging member as an urging means. By this force, a tension of about 2 to 5 kg is applied in the feeding direction of the intermediary transfer belt 44*b*. The inner secondary transfer roller 45*a* constitutes the secondary transfer device 45 as will be described hereinafter. The driving force is inputted to the intermediary transfer belt 44*b* by rotationally driving the driving roller 44*a*, and the intermediary transfer belt 44*b* is rotated (circulated) in the arrow direction (clockwise direction) in the figure at a predetermined peripheral speed corresponding to the peripheral speed of the photosensitive drum 51. In addition, on the inner peripheral surface side of the intermediary transfer belt 44*b*, the primary transfer rollers 47*y*, 47*m*, 47*c*, 47*k*, which are roller-type primary transfer members as primary transfer means, are disposed correspondingly to the photosensitive drums 51*y*, 51*m*, 51*c*, 51*k*, respectively. The primary transfer roller 47 holds the intermediary transfer belt 44*b* between itself and the photosensitive drum 51. By this, the primary transfer roller 47 contacts the photosensitive drum 51 by way of the intermediary transfer belt 44*b* to form a primary transfer portion (primary transfer nip) N1 where the photosensitive drum 51 and the intermediary transfer belt 44*b* are in contact with each other.

The toner image formed on the photosensitive drum 51 is primarily transferred onto the intermediary transfer belt 44*b* in the primary transfer portion N1. A primary transfer voltage source 75 (FIG. 2) is connected to the primary transfer roller 47. The primary transfer voltage supply 75 applies a primary transfer voltage (primary transfer bias) which is a DC voltage having a polarity opposite to the normal charging polarity of the toner (positive in this embodiment) to the primary transfer roller 47 during a primary transfer step. For example, when forming a full-color image, the yellow, magenta, cyan and black toner images formed on the photosensitive drums 51*y*, 51*m*, 51*c* and 51*k* are primarily transferred so as to be sequentially superimposed on the intermediary transfer belt 44*b*. The primary transfer voltage source 75 is connected to a voltage detecting sensor 75*a* which detects an output voltage and a current detecting sensor 75*b* which detects an output current (FIG. 2). In this embodiment, the primary transfer voltage sources 75*y*, 75*m*, 75*c* and 75*k* are provided for the primary transfer rollers 47*y*, 47*m*, 47*c* and 47*k*, respectively, and the primary transfer voltages applied to the primary transfer rollers 47*y*, 47*m*, 47*c* and 47*k* can be individually controlled.

Here, in this embodiment, the primary transfer roller 47 has an elastic layer of ion conductive foam rubber (NBR rubber) and a core metal. The outer diameter of the primary transfer roller 47 is, for example, 15 to 20 mm. In addition, as the primary transfer roller 47, a roller having an electric resistance value of $1\times10^5$ to $1\times10^8$ Ω (N/N (23° C., 50% RH) condition, 2 kV applied) can be preferably used. Further, in this embodiment, the intermediary transfer belt 44*b* is an endless belt having a three-layer structure including a base layer, an elastic layer, and a surface layer in the order named from the inner peripheral surface side toward the outer peripheral surface side. As the resin material constituting the base layer, a resin such as polyimide or polycarbonate, or a material containing an appropriate amount of carbon black as an antistatic agent in various rubbers can be suitably used. The thickness of the base layer is, for example, 0.05 to 0.15 mm. As the elastic material constituting the elastic layer, a material containing an appropriate amount of an ionic conductive agent in various rubbers such as urethane rubber and silicone rubber can be suitably used. The thickness of the elastic layer is 0.1 to 0.500 mm, for example. As a material constituting the surface layer, a resin such as a fluororesin can be suitably used. The surface layer has small adhesive force of the toner to the surface of the intermediary transfer belt 44*b* and makes it easier to transfer the toner onto the recording material S at a secondary transfer portion N2 (described later). The thickness of the surface layer is, for example, 0.0002 to 0.020 mm. In this embodiment, for the surface layer, one kind of resin material such as polyurethane, polyester, or epoxy resin, or two or more kinds of elastic materials such as elastic material rubber, elastomer, or butyl rubber, for example, are used as a base material. And, as a material for reducing surface energy and improving lubricity of this base material, powder or particles such as fluororesin, for example, with one kind or two kinds or different particle diameters are dispersed, so that a surface layer is formed. In this embodiment, the intermediary transfer belt 44*b* has a volume resistivity of $5\times10^8$ to $1\times10^{14}$ Ω.cm (23° C., 50% RH) and a hardness of MD1 hardness of 60 to 85° (23° C., 50% RH). In this embodiment, the static friction coefficient of the intermediary transfer belt 44*b* is 0.15 to 0.6 (23° C., 50% RH) (type 94*i* manufactured by HEIDON). Incidentally, in this embodiment, the three-layer structure was employed in the intermediary transfer belt 44*b*, but a single-layer structure of a material corresponding to the material of the above-described base layer may also be employed.

On the outer peripheral surface side of the intermediary transfer belt 44*b*, an outer secondary transfer roller 45*b* which constitutes the secondary transfer device 45 in cooperation with the inner secondary transfer roller 45*a* and which is a roller-type secondary transfer member as a secondary transfer means is disposed. The outer secondary transfer roller 45*b* sandwiches the intermediary transfer belt 44*b* between itself and the inner secondary transfer roller 45*a*. By this, the outer secondary transfer roller 45*b* contacts the inner secondary transfer roller 45*a* by way of the intermediary transfer belt 44*b* and forms a secondary transfer portion (secondary transfer nip) N2 where the intermediary transfer belt 44*b* and the outer secondary transfer roller 45*b* are in contact with each other. The toner image formed on the intermediary transfer belt 44*b* is secondarily transferred onto the recording material S, nipped and fed by the intermediary transfer belt 44*b* and the outer secondary transfer roller 45*b*, in the secondary transfer portion N2.

As described above, in this embodiment, the secondary transfer device 45 includes the inner secondary transfer roller 45*a* as a counter member, and the outer secondary transfer roller 45*b* as a secondary transfer member. The inner secondary transfer roller 45*a* is disposed opposed to the outer secondary transfer roller 45*b* by way of the intermediary transfer belt 44*b*. To the outer secondary transfer roller 45*b*, a secondary transfer voltage source 76 as a voltage applying means (applying portion) (FIG. 2) is connected. During a secondary transfer step, the secondary transfer voltage source 76 applies a secondary transfer voltage (secondary transfer bias) which is a DC voltage having a polarity opposite to the normal charge polarity of the toner (positive in this embodiment) to the outer secondary transfer roller 45*b*. To the secondary transfer voltage source 76, a voltage detecting sensor 76*a* for detecting the output voltage and a current detecting sensor 76*b* for detecting the output current are connected (FIG. 2). Further, in this embodiment, the core metal of the inner secondary transfer roller 45*a* is connected to the ground potential. That is, in this embodiment, the inner secondary transfer roller 45*a* is electrically grounded (connected to the ground). And, when the recording material S is supplied to the secondary transfer portion N2, a secondary transfer voltage with constant-voltage-control having a polarity opposite to the normal charge polarity of the toner is applied to the outer secondary transfer roller 45*b*. In this embodiment, a secondary transfer voltage of 1 to 7 kV is applied, a current of 40 to 120 μA, for example is caused to flow, and the toner image on the intermediary transfer belt 44*b* is secondarily transferred onto the recording material S. Incidentally, in this embodiment, the secondary transfer voltage source 76 applies the DC voltage to the outer secondary transfer roller 45*b*, so that the secondary transfer voltage is applied to the secondary transfer portion N2, but the present invention is not limited to such a constitution. For example, the secondary transfer voltage may also be applied to the secondary transfer portion N2 by applying the DC voltage from the secondary transfer voltage source 76 to the inner secondary transfer roller 45*a*. In this case, to the inner secondary transfer roller 45*a* as the secondary transfer member, the DC voltage of the same polarity as the normal charge polarity of the toner is applied, so that the outer secondary transfer roller 45*b* as the opposing member is electrically grounded. In this embodiment, the outer secondary transfer roller 45*b* includes an elastic layer of ion conductive foam rubber (NBR rubber) and a core metal. The outer diameter of the outer secondary transfer roller 45*b* is, for example, 20 to 25 mm. In addition, as the outer secondary transfer roller 45*b*, a roller having an electric resistance value of $1\times10^5$ to $1\times10^8$Ω (measured at N/N (23° C., 50% RH), 2 kV applied) can be preferably used.

The recording material S is fed from the feeding portion 90 in parallel to the above-described toner image forming operation. That is, the recording material S is stacked and accommodated in a recording material cassette 91 as a recording material accommodating portion. In this embodiment, the image forming apparatus 1 is provided with a plurality of recording material cassettes 91 (91*a*, 91*b*) each accommodating the recording materials S. The recording material S accommodated in each of the recording material cassettes 91 (91*a*, 91*b*) is fed toward a feeding passage 93 by a feeding roller 92 (92*a*, 92*b*) or the like as a feeding member. The recording material S fed to the feeding passage 93 is conveyed to a registration roller pair 43 as a feeding member by a conveying roller pair 94 as a conveying member. This recording material S is subjected to correction of oblique movement by the registration roller pair 43, and is timed to the toner image on the intermediary transfer belt

44b, and then is supplied toward the secondary transfer portion N2. The feeding portion 90 is constituted by the recording material cassette 91, the feeding roller 92, the feeding passage 93, the conveying roller pair 94, and the like.

The recording material S onto which the toner image has been transferred is fed to a fixing portion (fixing device) 46 as a fixing means. The fixing portion 46 includes a fixing roller 46a and a pressing roller 46b. The fixing roller 46a includes therein a heater as a heating means. The recording material S carrying the unfixed toner image is heated and pressed by being sandwiched and fed between the fixing roller 46a and the pressing roller 46b. By this, the toner image is fixed (melted and fixed) on the recording material S. Incidentally, the temperature of the fixing roller 46a (fixing temperature) is detected by a fixing temperature sensor 77 (FIG. 2).

The recording material S on which the toner image is fixed is fed through a discharge passage 48a by a discharging roller pair 48b or the like as a feeding member, and is discharged (outputted) through a discharge opening 48c, and then is stacked on a discharge tray 48d provided outside the apparatus main assembly 10. A discharging portion (discharging device) 48 is constituted by the discharge passage 48a, the discharging roller pair 48b, the discharge opening 48c, the discharge tray 48d, and the like. In the case of one-side printing (one-side image formation) in which the image is formed on one surface (side) on the recording material S, the recording material which passed through the fixing portion 46 and on which the toner image is fixed is discharged as it is on the discharge tray 48d as described above. Further, in this embodiment, the image forming apparatus 1 is capable of forming images on double (both) sides (double-side printing, automatic double-side printing, double-side image formation) in which the images are formed on the double surfaces (sides) on the recording material S. In addition, between the fixing portion 46 and the discharge opening 48c, a reverse feeding passage 12 for turning over the recording material S after the toner image is fixed on the first surface and for supplying the recording material S to the secondary transfer portion N2 again is provided. During the double-side printing, the recording material S after the toner image is fixed on the first surface is guided to the reverse feeding passage 12. This recording material S is reversed in feeding direction by a switch-back roller pair 13 device in the reverse feeding passage 12, and is guided to a double side feeding passage 14. Then, this recording material S is sent toward the feeding passage 93 by a re-feeding roller pair 15 provided in the double side feeding passage 14, and is conveyed to the registration roller pair 43, and then the recording material S is supplied toward the secondary transfer portion N2 by the registration roller pair 43. Thereafter, this recording material S is subjected to secondary transfer of the toner image on the second surface thereof similarly as during the image formation of the toner image on the first surface thereof, and after the toner image is fixed on the second surface, the recording material S is discharged to the discharge tray 48d. The double side feeding portion (double side feeding device) 11 is constituted by the reverse feeding passage 12, the switch-back roller pair 13, the double side feeding passage 14, the re-feeding roller pair 15, and the like. By actuation of the double side feeding portion 11, it is possible to form the images on double surfaces (sides) of a single recording material S.

The surface of the photosensitive drum 51 after the primary transfer is electrically discharged by the pre-exposure device 54. In addition, a deposited matter such as toner remaining on the photosensitive drum 51 without being transferred onto the intermediary transfer belt 44b during the primary transfer step (primary transfer residual toner) is removed from the surface of the photosensitive drum 51 by the drum cleaning device 55 and is collected. The drum cleaning device 55 scrapes off the deposited matter from the surface of the rotating photosensitive drum 51 by a cleaning blade as a cleaning member contacting the surface of the photosensitive drum 51, and accommodates the deposited matter in a cleaning container. The cleaning blade is contacted at a predetermined pressing force to the surface of the photosensitive drum 51 so as to face a counter direction in which the outer end portion of the free end portion faces the upstream side in the rotational direction of the photosensitive drum 51. Further, the intermediary transfer unit 44 includes the belt cleaning device 60 as an intermediary transfer member cleaning means. A deposited matter such as toner remaining on the intermediary transfer belt 44b without being transferred onto the recording material S during the secondary transfer step (secondary transfer residual toner) or the like is removed and collected from the surface of the intermediary transfer belt 44b by the belt cleaning device 60.

At an upper portion of the apparatus main assembly 10, the reading portion (reading device) 80 as a reading means is disposed. The reading portion 80 includes an automatic original feeding device (automatic document feeder (ADF)) 81, a platen glass 82, a light source 83, an optical system 84 provided with a mirror group 84a and an imaging lens 84b and the like, and a reading element 85 such as a CCD. In this embodiment, the reading portion 80 is capable of sequentially reading an image of an original (the recording material on which the image is formed), placed on the platen glass 82, by the reading element 85 by way of the optical system 84 while subjecting the image to scanning exposure to light by a movable light source 83. In this case, the reading portion 80 sequentially illuminates the original disposed on the platen glass 82 with light by the movable light source 83, and reflected light images from the original are sequentially formed on the reading element 85 by way of the optical system 84. By this, the original image can be read at a dot density determined in advance, by the reading element 85. Further, in this embodiment, the reading portion 80 sequentially exposes the original image fed by the automatic original feeding device 81 to light with feeding of the original, so that the reading portion 80 is capable of sequentially reading the original image by the reading element 85 by way of the optical system 84. In this case, the reading portion 80 sequentially illuminates the original passing through a predetermined reading position on the platen glass 82 with light by the light source 83, so that reflected light images from the original are sequentially formed on the reading element 85 by way of the optical system 84. By this, the original image can be read at the dot density determined in advance, by the reading element 85. The automatic original feeding device 81 automatically feeds the originals one by one in a separated state so as to pass through the above-described reading position of the reading portion 80. Thus, the reading portion 80 optically reads the image on the recording material S disposed on the platen glass 82 or fed by the automatic original feeding device 81 and then converts the image into an electric signal. Further, the automatic original feeding device 81 is capable of automatically reading the images on both sides of the recording material S.

For example, in the case where the image forming apparatus 1 operates as a copying machine, the image of the original read by the reading portion 80 is sent, as image data for three colors of, for example, red (R), green (G), and black (B) (each 8 bits), to an image processing portion of the controller 30. In the image processing portion, the image data of the original is subjected to predetermined image processing as needed, and is converted into image data for four colors of yellow, magenta, cyan and black. As the above-described image processing, it is possible to cite shading correction, positional deviation correction, brightness/color space conversion, gamma correction, frame elimination, color/movement editing, and the like. The image data corresponding to the four colors of yellow, magenta, cyan and black are sequentially sent to the exposure devices 42*y*, 42*m*, 42*c* and 42*k*, respectively, and are subjected to the above-described image exposure depending thereon. Further, as described with more specificity later, the reading portion 80 is also used for reading patches of a chart (acquiring density information (brightness information)) in an operation in an adjustment mode.

FIG. 2 is a block diagram showing a schematic constitution of a control system of the image forming apparatus 1 of this embodiment. As shown in FIG. 2, the controller 30 is constituted by a computer. The controller 30 includes, for example, a CPU 31 as a calculating means, a ROM 32 as a storing means for storing a program for controlling each portion, a RAM 33 as a storing means for temporarily storing data, and an input/output circuit (I/F) 34 for inputting/outputting signals to and from the outside. The CPU (calculating device) 31 is a microprocessor which controls the entire image forming apparatus 1 and is a main part of the system controller. The CPU 31 is connected to the feeding portion 90, the printer portion 40, the discharge portion 48, and the operation portion 70 via the input/output circuit 34, and exchanges signals with these portions, and controls the operation of each of these portions. The ROM 32 stores an image formation control sequence for forming the image on the recording material S. The controller 30 is connected to the charging voltage source 73, the developing voltage source 74, the primary transfer voltage source 75, and the secondary transfer voltage source 76, which are controlled by signals from the controller 30, respectively. In addition, the controller 30 is connected to the temperature sensor 71, the humidity sensor 72, the voltage detecting sensor 75*a* and the current detecting sensor 75*b* of the primary transfer voltage source 75, the voltage detecting sensor 76*a* and the current detecting sensor 76*b* of the secondary transfer voltage source 76, and the fixing temperature sensor 77. The signals detected by the respective sensors are inputted to the controller 30.

Then operating portion 70 includes an inputting portion such as an operation button as an input means, and a display portion 70*a* including a liquid crystal panel as display means. Incidentally, in this embodiment, the display portion 70*a* is constituted as a touch panel, and also has a function as the input means. An operator such as a user or a service person can cause the image forming apparatus 1 to execute a job (described later) by operating the operating portion 70. The controller 30 receives the signal from the operating portion 70 and operates various devices of the image forming apparatus 1. The image forming apparatus 1 can also execute the job on the basis of an image forming signal (image data, control command) supplied from the external device 200 such as the personal computer.

In this embodiment, the controller 30 includes an image formation pre-preparation process portion 31*a*, an ATVC process portion 31*b*, an image formation process portion 31*c*, and an adjusting process portion 31*d*. In addition, the controller 30 includes a primary transfer voltage storage/operation portion 31*e* and a secondary transfer voltage storage/operation portion 31*f*. Here, each of these process portions and storage/operation portions may be provided as a portion or portions of the CPU 31 or the RAM 33. For example, the controller 30 (specifically the image formation process portion 31*c*) can execute a job. In addition, the controller 30 (specifically the ATVC process portion 31*b*) can execute ATVC (setting mode) for the primary transfer portion and the secondary transfer portion. Details of the ATVC will be described hereinafter. In addition, the controller 30 (specifically the adjusting process portion 31*d*) can execute an operation in an adjustment mode for adjusting a set value of the secondary transfer voltage. Details of the operation in the adjustment mode will be described hereinafter.

Incidentally, in this embodiment, the controller 30 (image forming process portion 31*c*) is capable of executing an operation in a plural-color mode in which a plurality of color images are formed by applying a primary transfer voltage to a plurality of primary transfer portions N1 and an operation in a single-color mode in which an image of a single color is formed by applying a primary transfer voltage to only one primary transfer portion N1 of the plurality of primary transfer portions N1.

Here, the image forming apparatus 1 executes the job (image output operation, print job) which is series of operations to form and output an image or images on single or a plurality of recording materials S started by one start instruction. The job includes an image forming step, a pre-rotation step, a sheet (paper) interval step in the case where the images are formed on the plurality of recording material S, and a post-rotation step in general. The image forming step is performed in a period in which formation of an electrostatic image for the image actually formed and outputted on the recording material S, formation of the toner image, primary transfer of the toner image and secondary transfer of the toner image are carried out, in general, and during image formation (image forming period) refers to this period. Specifically, timing during the image formation is different among positions where the respective steps of the formation of the electrostatic image, the toner image formation, the primary transfer of the toner image and the secondary transfer of the toner image are performed. The pre-rotation step is performed in a period in which a preparatory operation, before the image forming step, from an input of the start instruction until the image is started to be actually formed, is performed. The sheet interval step is performed in a period corresponding to an interval between a recording material S and a subsequent recording material S when the images are continuously formed on a plurality of recording materials S (continuous image formation). The post-rotation step is performed in a period in which a post-operation (preparatory operation) after the image forming step is performed. During non-image formation (non-image formation period) is a period other than the period of the image formation (during image formation) and includes the periods of the pre-rotation step, the sheet interval step, and the post-rotation step and further includes a period of a pre-multi-rotation step which is a preparatory operation during turning-on of a main switch (voltage source) of the image forming apparatus 1 or during restoration from a sleep state.

Figure 3:
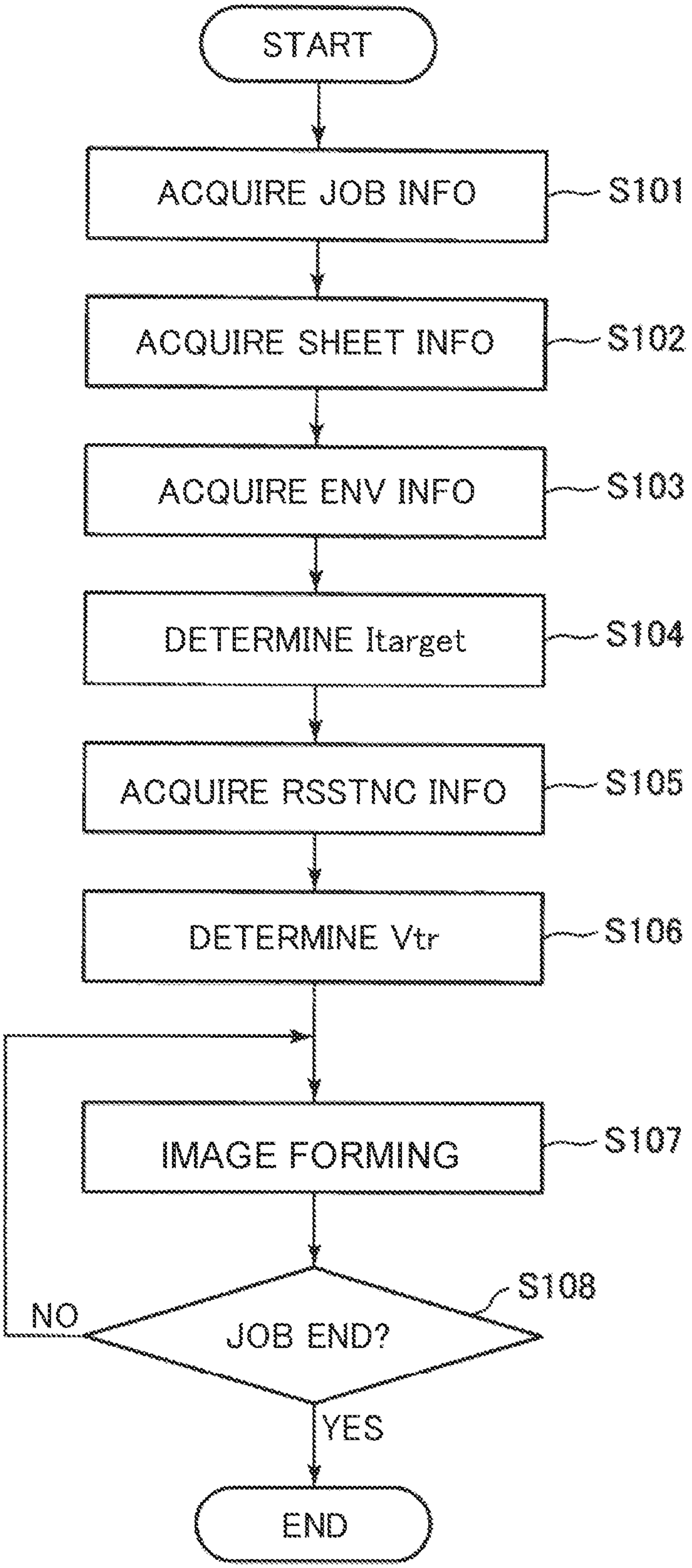
FIG. 3 is a flowchart showing an outline of a procedure of control of a secondary transfer voltage.

Next, secondary transfer voltage control will be described. FIG. 3 is a flow chart showing an outline of a procedure relating to the secondary transfer voltage control in this embodiment. Generally, the secondary transfer voltage control includes constant-voltage control and constant-current control, and in this embodiment, the constant-voltage control is used.

First, the controller 30 (image formation pre-preparation process portion 31*a*) causes the image forming portion to start an operation of a job after acquiring information on the job from the operation portion 70 or the external device 200 (S101). In the information on this job, image information designated by an operator and information on the recording material S are included. In this embodiment, the information on the recording material S includes information on a kind of the recording material S which is also called a category (paper kind category) of the recording material S such as "plain paper, thick paper, synthetic paper, . . . ". Further, the information on the recording material S may include a size (width, length) of the recording material S, and may also include information (thickness, basis weight and the like) relating to the thickness of the recording material S, and information relating to a surface property of the recording material S such as whether or not the recording material S is coated paper. Incidentally, in general, the kind of the recording material S is understood to include any distinguishable pieces of information on the recording materials S, such as categories of the recording material (paper kind categories) indicating attributes based on general characteristics including plain paper, high-quality paper, glossy paper (gloss paper), coated paper, embossed paper, thick paper, thin paper, and synthetic paper, and in addition, numerical values or numerical value ranges such as a basis weight, a thickness, a size, and rigidity; or brands (including manufacturers, trade names, model names, and the like). However, in this embodiment, the kind of the recording material S refers to a so-called category of the recording materials S (paper kind category). Specifically, in this embodiment, kind information relating to the kind of the recording material S is information on the kind of the recording material S classified by information other than the thickness of the recording material S. The controller 30 (image formation pre-preparation process portion 31*a*) writes this job information in the RAM 33 (S102).

Next, the controller 30 (image formation pre-preparation process portion 31*a*) acquires environment information detected by the temperature sensor 71 and the humidity sensor 72 (S103). In the ROM 32, information showing correction between the environment information and a target current Itarget for transferring the toner image from the intermediary transfer belt 44*b* onto the recording material S is stored. The controller 30 (secondary transfer voltage storage/operation portion 31*f*) acquires the target current Itarget corresponding to the environment from the information showing the correlation between the environment information and the target current Itarget, on the basis of the environment information read in S103. Then, the controller 30 writes this target current Itarget in the RAM 33 (or the secondary transfer voltage storage/operation portion 31*f*) (S104). Incidentally, why the target current Itarget is changed depending on the environment information is that the toner charge amount varies depending on the environment. The information showing the correlation between the environment information and the target current Itarget has been acquired in advance by an experiment or the like.

Figure 4:
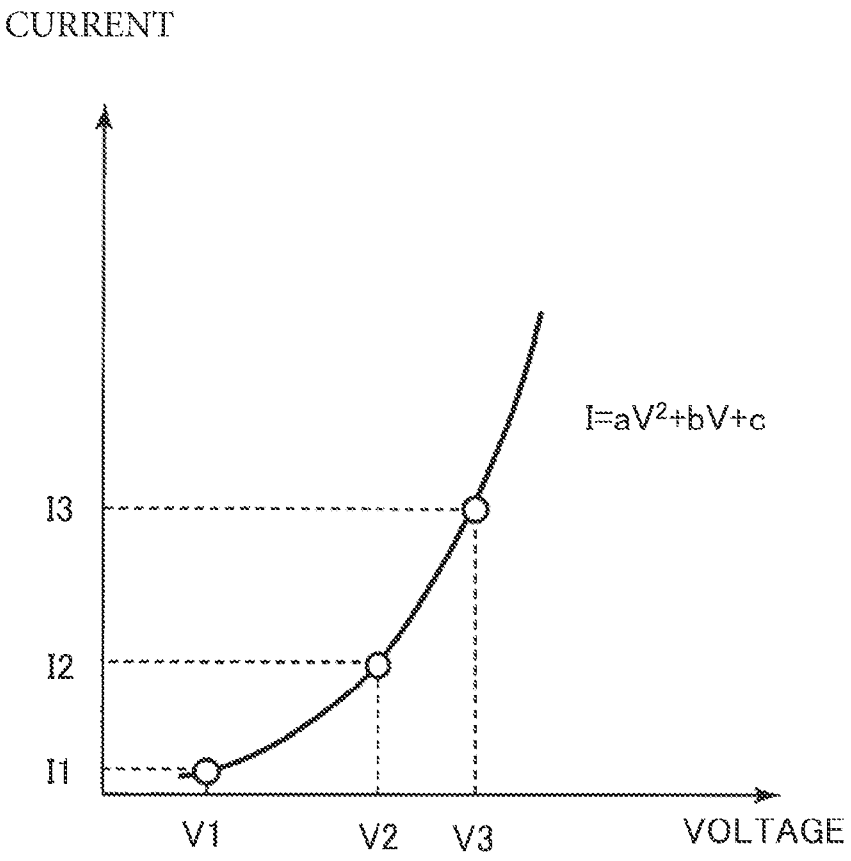
FIG. 4 is a graph showing an example of a voltage-current characteristic acquired in the control of the secondary transfer voltage.

Next, the controller 30 (ATVC process portion 31*b*) acquires information on an electric resistance of the secondary transfer portion N2 by the ATVC (active transfer voltage control) before the toner image on the intermediary transfer belt 44*b* and the recording material S onto which the toner image is transferred reach the secondary transfer portion N2 (S105). That is, in a state in which the outer secondary transfer roller 45*b* and the intermediary transfer belt 44*b* are contacted to each other, predetermined voltages of a plurality of levels are applied (supplied) from the secondary transfer voltage source 76 to the outer secondary transfer roller 45*b*. Then, current values when the predetermined voltages are applied are detected by the current detecting sensor 76*b*, so that a relationship between the voltage and the current (voltage-current characteristic) as shown in FIG. 4 is acquired. The controller 30 writes information on this relationship between the voltage and the current in the RAM 33 (or the secondary transfer voltage storage/operation portion 31*f*). This relationship between the voltage and the current changes depending on the electric resistance of the secondary transfer portion N2. The relationship between the voltage and the current is such that the current changes substantially linearly relative to the voltage (i.e., is linearly proportional to the voltage) (see FIG. 10) or such that the current changes so as to be represented by a polynomial expression consisting of two or more terms of the voltage (for example, quadratic expression) (see FIG. 4). The number of predetermined voltages or currents supplied when the information on the electric resistance of the secondary transfer portion N is acquired is three or more (multiple levels).

Then, the controller 30 (secondary transfer voltage storage/operation portion 31*f*) acquires a voltage value to be applied from the secondary transfer voltage source 76 to the outer secondary transfer roller 45*b* (S106). That is, on the basis of the target current Itarget written in the RAM 33 in S104 and the relationship between the voltage and the current acquired in S105, the controller 30 acquires a voltage value Vb necessary to cause the target current Itarget to flow in a state in which the recording material S is absent in the secondary transfer portion N2. This voltage value Vb corresponds to a secondary transfer portion part voltage (transfer voltage corresponding to the electric resistance of the secondary transfer portion N2). Further, in the ROM 32, information for acquiring a recording material part voltage (transfer voltage corresponding to the electric resistance of the recording material S) Vp is stored. For example, this information is set as table data indicating a relationship between water content and the recording material part voltage Vp in an ambient atmosphere for each of sections of basis weights of recording material S as shown in FIG. 5. The table data for acquiring the recording material part voltage Vp as shown in FIG. 5 can be acquired by selecting a recording material S of a representative brand for each section of the basis weight and then by subjecting the selected recording material S to an experiment or the like in advance. Here, the controller 30 (image formation pre-preparation process portion 31) is capable of acquiring ambient water content on the basis of environment information (temperature, humidity) detected by the temperature sensor 71 and the humidity sensor 72. On the basis of the information on the job acquired in S101 and the environment information acquired in S103, the controller 30 (secondary transfer voltage storage/operation portion 31*f*) acquires the recording material part voltage Vp from the above-described table data. Incidentally, in FIG. 5, as an example, the recording material part voltage Vp set for each section of the basis weight is shown, but the recording material part voltage Vp may be set for each kind of the recording material S. For example, the table data for acquiring the recording material part voltage Vp can be acquired by selecting the recording material S of the representative brand for each kind of the recording material and then by subjecting the selected recording material S to the experiment or the like in advance.

Further, in the case where the adjusting value is set by the operation in the adjustment mode, described later, for adjusting the set value of the secondary transfer voltage, the controller 30 (secondary transfer voltage storage/operation portion 31*f*) acquires an adjusting amount ΔV depending on the adjusting value. As described later, this adjusting amount ΔV is stored in the RAM 33 (or the secondary transfer voltage storage/operation portion 31*f*) in the case where the adjusting value is set by the operation in the adjustment mode.

The controller 30 acquires Vb+Vp+ΔV which is the sum of the above-described voltage values Vb, Vp and ΔV, as a secondary transfer voltage Vtr applied from the secondary transfer voltage source 76 to the outer secondary transfer roller 45*b* when the recording material S passes through the secondary transfer portion N2. Then, the controller 30 writes this Vtr (=Vb+Vp+ΔV) in the RAM 33 (or the secondary transfer voltage storage/operation portion 31*f*). At this time, the secondary transfer voltage Vtr at which ΔV is ±0 V is a standard secondary transfer voltage.

Next, the controller 30 (the image formation process portion 31*c*) causes the image forming portion to form the image and to send the recording material S to the secondary transfer portion N2 and causes the secondary transfer device to perform the secondary transfer by applying the secondary transfer voltage Vtr determined as described above (S107). Thereafter, the controller 30 (the image formation process portion 31*c*) repeats the processing of S107 until all the images in the job are transferred and completely outputted on the recording material S (S108).

Incidentally, also as regards the primary transfer portion N1, the ATVC similar to the above-described ATVC is carried out in a period from a start of the job until the toner image is fed to the primary transfer portion N1, but detailed description thereof will be omitted in this embodiment.

3. Outline of Adjustment Mode

Next, an outline of an operation in an adjustment mode for adjusting the set value of the secondary transfer voltage will be described.

Depending on the kind or the like of the recording material S used by the user, the electric resistance value of the recording material S is different from the electric resistance value of the representative recording material S held in the above-described table data in some instances. For that reason, in the case where the recording material part voltage Vp of the representative recording material S held in the table data is used, the electric resistance value of the recording material S actually used and the electric resistance value of the above-described representative recording material S are different from each other, and therefore, optimum transfer cannot be performed in some instances. Further, in order to prevent a defective image from occurring when the toner (image) on the intermediary transfer belt is transferred onto the recording material S, it is desired that an optimum secondary transfer voltage Vtr is applied. In the case where the electric resistance value of the recording material S used by the user is higher than the electric resistance value of the representative recording material S held as the table data, there is a possibility that a current necessary to transfer the toner becomes insufficient and thus a transfer void image generates. In that case, it is desired that the secondary transfer voltage Vtr is set at a high value. Further, in the case where a water content of the recording material S is decreased and an electric discharge phenomenon is liable to occur, there is a possibility that a defective image such as a white dropout image due to abnormal discharge generates. In that case, it is desired that the secondary transfer voltage Vtr is set at a low value.

Therefore, the image forming apparatus 1 of this embodiment is made operable in an adjusting mode which is a mode executed for obtaining an optimum adjusting amount for an individual recording material S actually used in order to set the secondary transfer voltage at an appropriate secondary transfer voltage Vtr at which the defective image does not generate.

In this operation in the adjustment mode, a chart on which a plurality of representative color patches (test images, density images, pattern images) are transferred while the set value of the secondary transfer voltage (test voltage) is switched for each patch is formed and outputted. In this embodiment, in the operation in this adjusting mode, by using the chart on which solid density images and half-tone density images are formed, the secondary transfer voltage Vtr is applied while switching the adjusting amount ΔV of the secondary transfer voltage for each patch by increasing or decreasing the adjusting amount ΔV. By this, the chart C is outputted while changing the transfer property of the patch. Then, from the patches transferred under application of the different secondary transfer voltages Vtr, the patch for which an optimum transfer property is obtained is selected, so that an optimum adjusting amount ΔV is acquired. Further, in the operation in the adjusting mode, a simple adjusting mode (semi-automatic adjusting mode) in which the outputted chart is read by the reading portion 80 and then the optimum adjusting value ΔV is selected automatically on the basis of the acquired density data is employed. That is, in this embodiment, in the operation in the adjustment mode, on the basis of a result, read by the reading portion 80, of density information (brightness information) of the patch on the chart, the controller 30 presents information relating to a recommended adjusting amount ΔV of the set value of the secondary transfer voltage. By this, necessity that the operator confirms the image on the chart by eye observation or the like is reduced, so that it becomes possible to more appropriately adjust the set value of the secondary transfer voltage while alleviating an operation load of the operator.

Thus, by the operation in the simple adjusting mode (semi-automatic adjusting mode), an operation in which the operator selects and inputs the set value of the secondary transfer voltage by discrimination through eye observation is not necessary, and therefore, this mode is effective in burden alleviation of the operator and shortening of a working (operation) time.

4. Chart

Next, the chart (adjusting chart, image for adjustment, test page) outputted in the operation in the adjustment mode in this embodiment will be described. Parts (a) and (b) of FIG. 6 and parts (a) to (d) of FIG. 7 are schematic illustrations each showing a chart 100 in this embodiment.

In this embodiment, in the operation in the adjustment mode, depending on a size of the recording material S used, roughly, two kinds of charts 100 shown in FIG. 6 and FIG. 7, respectively, are outputted. Each of parts (a) and (b) of FIG. 6 shows the chart 100 outputted in the case where a length of the recording material S with respect to a recording material feeding direction is 420 mm-487 mm. Each of parts (a) to (d) of FIG. 7 shows the chart 100 outputted in the case where the length of the recording material S with respect to the recording material feeding direction is 210 mm-419 mm.

Incidentally, in this embodiment, the chart can be formed and outputted on double surfaces (sides) of the recording material S so that the secondary transfer voltage during the secondary transfer onto each of a first side (front side) and a second side (back side) in double-side printing can be adjusted. In each of FIG. 6 and FIG. 7, the chart in the case where the chart is formed on one side of the recording material S (hereinafter, this chart is referred to as a "one-side chart") and the chart in the case where the chart is formed on double sides of the recording material S (hereinafter, this chart is referred to as a "double-side chart") are shown. In this embodiment, formation of the chart 100 is performed by an operation in a full-color mode. The double side chart is formed by the double-side printing operation using the above-described double side feeding portion 11. Here, the size of the recording material S is represented by (recording material width (length with respect to a main scan direction))×(recording material length with respect to a sub-scan direction)). The recording material width is a length of the recording material S with respect to a direction (widthwise direction) substantially perpendicular to the recording material feeding direction when the recording material S passes through the secondary transfer portion N2. The recording material length is a length of the recording material S with respect to a direction substantially parallel to the recording material feeding direction when the recording material S passes through the secondary transfer portion N2.

Each of parts (a) and (b) of FIG. 6 shows a chart for a large size (hereinafter, referred to as a "large chart") 100L (100La, 100Lb) outputted in the case where a recording material S of a large size such as A3 size (297 mm×420 mm) or ledger size (about 280 mm×about 432 mm) is used. Part (a) shows a large chart 100La in the case where the one side chart is outputted (or on the first surface in the case where the double side chart is outputted). Further, part (b) of FIG. 6 shows a large chart 100Lb on the second surface in the case where the double side is outputted.

Each of parts (a) to (d) of FIG. 7 shows a chart for a small size (hereinafter, referred to as a "small chart") 100S (100Sa, 100Sb) outputted in the case where a recording material S of a small size such as A4 landscape size (297 mm×210 mm) or letter landscape size (about 280 mm×about 216 mm) is used. Parts (a) and (b) of FIG. 7 show a small chart 100Sa on a first sheet and a small chart 100Sa on a second sheet, respectively, in the case where the one side chart is outputted (or on the first surface in the case where the double side chart is outputted). Parts (c) and (d) of FIG. 7 show a small chart 100Sa on a first sheet and a small chart 100Sb on a second sheet, respectively, on the second surface in the case where the double side chart is outputted.

In the operation in the adjusting mode in this embodiment, a chart 100 including patches which are suitable for discriminating the transfer property and which includes said density images of blue (secondary color), solid density images of black (single color), and half-tone density images of black (single color), i.e., gray is used. In this embodiment, the chart 100 includes a patch set in which one blue solid patch 101, one black solid patch 102, and two halftone patches 103 are arranged in the widthwise direction. And, in the large chart 100L of FIG. 6, eleven sets of patch sets 101 to 103 in the widthwise direction are arranged in the feeding direction. Further, in the small chart 100S of FIG. 7, ten sets of the patch sets 101 to 103 in the widthwise direction are arranged in the feeding direction. Incidentally, in this embodiment, the halftone patches 103 are gray (black halftone) patches. Here, the solid image is an image with a maximum density level. In this embodiment, the blue solid image is a superposed image of images of magenta (M) toner=100% and cyan (C) toner=100% and is 200% in toner application amount. The black solid image is an image of black (K) toner=100%. Further, the halftone image (gray-scaled image) is, for example, an image with a toner application amount of 10-80% when the toner application amount of the solid image is 100%.

In addition, in this embodiment, the chart 100 includes patch identification information (patch number) 104 for identifying the set value of the secondary transfer voltage applied to each patch set in association with each of 11 patch sets 101 to 103. This identification information (patch number) 104 may be a value corresponding to an adjusting (adjustment) value of the secondary transfer voltage described later. In the large chart 100L of FIG. 6, eleven pieces of the patch identification information (patch number) 104 (11 pieces of −5 to 0 to +5 in this embodiment) corresponding to eleven steps (levels) of secondary transfer voltage settings are provided. In the small chart 100S of FIG. 7, ten pieces of the patch identification information (patch number) 104 (5 pieces of −4 to 0 on the first sheet and 5 pieces of +1 to +5 on the second sheet in this embodiment) corresponding to ten steps (levels) of the secondary transfer voltage settings are provided. That is, the adjusting amount ΔV associated with the patch number indicated on a side of each patch set is set by being added to or subtracted from the normal secondary transfer voltage Vtr acquired in the above-described secondary transfer voltage control. The patch set of which patch number is "0" is transferred under application of the normal secondary transfer voltage Vtr which is the secondary transfer voltage Vtr=Vb+Vp+ΔV in which the adjusting amount ΔV is ±0 V. A switching width (range) of the adjusting amount ΔV of the secondary transfer voltage for each patch set will be specifically described later. Further, the chart 100 may be provided with front/back identification information 105 indicating at least one of the first side (front side) and the second side (back side) of the recording material S on at least one of the first side (front side) and the second side (back side) of the recording material S.

The size of the patch is required to be large enough to permit the operator to easily discriminate whether there is an image defect or not. For the transferability of the blue solid patch 101 and the black solid patch 102, if the size of the patch is small, it can be difficult to discriminate the defect, and therefore, the size of the patch is preferably 10 mm square or more, and when the size of the patch is 25 mm square or more, it is further preferable.

The image defects due to electric discharge which occur when the secondary transfer voltage is increased in the halftone patch 103 are often in the form of white spots. This image defect tends to be easy to discriminate even in a small size image, compared to the transferability of the solid image. However, it is easier to observe the image defect if the image is not too small, and therefore, in this embodiment, the width of the halftone patch 103 in the feeding direction is the same as the width of the blue solid patch 101 and the black solid patch 102 in the feeding direction. In addition, the interval between the patch sets 101 to 103 in the feeding direction may only be required to be set so that the secondary transfer voltage can be switched. In this embodiment, each of the blue solid patch 101 and the black solid patch 102 is a square (one side of which is substantially parallel to the widthwise direction) of 25.7 mm×25.7 mm. Further, in this embodiment, each of the halftone patches 103 at opposite end portions with respect to the width direction is 25.7 mm in width with respect to the width direction, and the widthwise direction thereof extends to an extreme end portion (which may include a margin described later). Further, in this embodiment, the interval between the patch sets 101 to 103 in the feeding direction is 9.5 mm. The secondary transfer voltage is switched at a timing when a portion on the chart 100 corresponding to this interval passes through the secondary transfer portion N2. In this embodiment, the patch sets 101 to 103 are sequentially transferred from an upstream side to a downstream side of the feeding direction of the recording material S during formation of the chart 100 by using a plurality of secondary transfer voltages made different so as to sequentially increase in absolute value. However, the present invention is not limited thereto. The patch sets 101 to 103 may also be sequentially transferred from the upstream side to the downstream side of the recording material feeding direction during the formation of the chart 100 by using the plurality of secondary transfer voltages made different so as to sequentially decrease in absolute value.

Incidentally, it is preferable to prevent patches from being formed in the neighborhood of the leading and trailing ends of the recording material S in the recording material feeding direction (for example, in the range of about 20 to 30 mm inward from the edge). The reason for this will be described. That is, of the end portions in the feeding direction of the recording material S, there may be an image defect that occurs only at the leading end or the trailing end. This is because in this case, it may be difficult to determine whether or not an image defect has occurred because the secondary transfer voltage is changed. That is, as regards the leading end and the trailing end of the recording material S, particularly when the thick paper or the thin paper is used, there is a possibility that another defective image which is liable to generate only on a leading end side or a trailing end side generates, and therefore, the patches are not formed.

A size of a maximum recording material S usable in the image forming apparatus 1 of this embodiment is 13 inches (about 330 mm)×19.2 inches (about 487 mm), and the large chart 100L of FIG. 6 corresponds to the recording material S of this size. In the case where the size of the recording material S is 13 inches×19.2 inches or less and the A3 size (297 mm×420 mm) or more, a chart corresponding to image data cut out of the image data of the large chart 100L of FIG. 6 depending on the size of the recording material S is outputted. At this time, in this embodiment, the image data is cut out in conformity to the size of the recording material S on a leading end center (line) basis. That is, the image data is cut out in a manner such that the leading end of the recording material S with respect to the feeding direction and the leading end (upper end in the figure) of the large chart 100L are aligned with each other and that a center (line) of the recording material S with respect to the widthwise direction and a center (line) of the large chart 100L with respect to the widthwise direction are aligned with each other. Further, in this embodiment, the image data is cut out so that a margin of 2.5 mm is provided at each of end portions (opposite end portions with respect to each of the widthwise direction and the recording material feeding direction in this embodiment). For example, in the case where the large chart 100L is outputted on the recording material S with the A3 size (297 mm×420 mm), the image data in a range of 292 mm×415 mm is cut out by providing a margin of 2.5 mm at each of the end portions. Then, the large chart 100L corresponding to the image data is outputted on the recording material S with the A3 size (297 mm×420 mm) on the leading end center (line) basis. In the case where the recording material S of which width is smaller than 13 inches is used, a dimension of the halftone patch 103 at each of the end portions with respect to the widthwise direction becomes small. Further, in the case where the recording material S of which width is smaller than 13 inches is used, a margin at a trailing end portion with respect to the recording material feeding direction becomes small. As described above, on the large chart 100L, the 11 patch sets of −5 to 0 to +5 in patch number are disposed. The 11 sets of the patch sets 101 to 103 on the large chart 100L are disposed in a range of 387 mm with respect to the feeding direction so as to all be within a length of 415 mm with respect to the feeding direction in the case where the size of the recording material S is the A3 size.

In this embodiment, in the case where the recording material S of which size is smaller than the A3 size (297 mm×420 mm) is used, the small chart 100S is outputted. The small chart 100S of FIG. 7 corresponds to sizes from an A5 size (short edge feeding) to a size smaller than the A3 size (297 mm×420 mm) (i.e., lengths from 210 mm to 419 mm in the feeding direction). As described above, on the small chart 100S, 10 patch sets consisting of 5 sets of −4 to 0 in patch number on a first sheet and 5 sets of +1 to +5 in patch number on a second sheet are disposed. The size of the image data on the small chart 100S is 13 inches×210 mm. With respect to the widthwise direction, the halftone patch 103 becomes small in conformity to the size of the recording material S. With respect to the feeding direction, the 5 patch sets are disposed so as to fall within a length of 167 mm in the feeding direction, and a margin of the trailing end portion becomes long in conformity to the length of the recording material S ranging from 210 mm to 419 mm. In the case of the recording material S with the length of 210 mm to 419 mm in the feeding direction, only the 5 patch sets can be formed on one sheet with respect to the feeding direction. For that reason, in order to increase the number of the patches, the chart is divided into those on two sheets, so that 10 patch sets consisting of the 5 patch sets of −4 to 0 in patch number and 5 patch sets of +1 to +5 in patch number are formed in total. Incidentally, in the case of the small chart 100S, the patch set of −5 in patch number provided on the large chart 100L is omitted. Incidentally, the small chart 100 may also be constituted so as to be capable of forming the patch set of −5 in patch number.

Further, in this embodiment, irrespective of the size of the recording material S, the blue solid patches 101 and the black solid patches 102 are disposed so as not to overlap with each other between the first side (front side) and the second side (back side) of a double side chart on the recording material S. In this embodiment, a patch interval with respect to the widthwise direction is 5.4 mm. This is because a variation in patch density on the second side due to the influence of the patch density on the first side is suppressed and thus adjustment of the secondary transfer voltage on the second side is performed accurately.

Further, in this embodiment, not only a standard size but also an arbitrary size (free size) recording material S is usable by an operator inputting and designating through the operating portion 70 or the external device 200, so that the chart 100 can be outputted.

Here, a single chart 100 may be formed on one side (surface) of a single recording material S or on one side (surface) of each of a plurality of recording materials S (i.e., may be a single set of charts including a set of patch group changed stepwise in test voltage). In the above-described embodiment, each of the large chart 100La (first side) and the large chart 100Lb (second side) corresponds to the single chart. Further, in the above-described embodiment, the small charts 100Sa (first side) on the first sheet and the second sheet corresponds to the single chart as a whole. Similarly, the small charts 100Sb (second side) on the first sheet and the second sheet corresponds to the single chart as a whole.

5. Problem

As described above, in the operation in the adjusting mode, the value of the transfer voltage applied during the transfer of the patches is desired so that a transfer current value corresponding to the value of the applied transfer voltage is changed from a current value range before a patch transfer property is obtained to a current value range after the patch transfer property is obtained. However, as regards an electric resistance value of the recording material used for outputting the chart, there are various electric resistance values from a lowest electric resistance value to a highest electric resistance value. Here, in an operation in a conventional adjusting mode, in general, even in the case where the electric resistance value of the recording material is different, the transfer voltage when the plurality of patches are transferred is switched with the same transfer voltage switching width. For that reason, the transfer current value changed within the surface of the recording material used for outputting the chart is largely different between the case where the recording material is low in electric resistance value and the case where the recording material is high in electric resistance value.

FIG. 8 is a graph showing a relationship between the secondary transfer voltage (adjusting amount ΔV) and the transfer current value for each patch (patch set) in the case where a low-resistance recording material S and a high-resistance recording material S are used when a one-side large chart 100La (part (a) of FIG. 6) is outputted as the chart 100. The abscissa of FIG. 8 represents the secondary transfer voltage (the adjusting amount ΔV) applied to each patch. In FIG. 8, the secondary transfer voltage corresponding to the adjusting amount ΔV ("±0 V") for which the patch number is 0 is the standard secondary transfer voltage in the case where the representative recording material S is used. Further, the ordinate of FIG. 8 represents the transfer current value of the current flowing through each patch when the chart 100 is outputted while switching the secondary transfer voltage with a switching width of Δ75 V/(one) level. As shown in FIG. 8, in the case where the high-resistance recording material S is used, compared with the case where the chart 100 is outputted with the same switching width of the secondary transfer voltage by using the low-resistance recording material S, a difference in value between secondary transfer currents flowing through the respective patches is small. For that reason, in the case where the high-resistance recording material S is used, there is no difference in transfer property for each patch, and therefore, it becomes difficult in some instances that an optimum set value of the secondary transfer voltage is discriminated and selected by the operation in the adjusting mode.

Thus, in the operation in the conventional adjusting mode, in general, even in the case where the electric resistance value of the recording material used is different, the switching width of the adjusting amount ΔV of the transfer voltage for each patch is constant. For that reason, there is a case that a width of the transfer current value fluctuating in the chart is not appropriate, so that it becomes difficult in some instances that the optimum set value of the secondary transfer voltage is selected.

Incidentally, JP-A 2013-37185 discloses that as a reference of the transfer voltage which is a standard determined depending on a thickness of the recording material, a transfer voltage increased by each predetermined rate is applied and a chart is outputted. However, the electric resistance value of the recording material largely changes due to a factor, other than the thickness, such as a material or the like of the recording material in some instances, so that the above-described method cannot meet such a case in some instances.

For that reason, it is required that the transfer voltage is appropriately set even in the case where the recording materials different in electric resistance value are used depending on the operation in the adjusting mode using the chart on which the plurality of patches are formed.

6. Operation in Adjustment Mode

Next, the operation in the adjustment mode will be described. In the operation in the adjusting mode in this embodiment, depending on the kind of the recording material S used for outputting the chart, the switching width of the adjusting amount ΔV of the secondary transfer voltage for each patch is changed. By setting the adjusting amount ΔV at an adjusting amount ΔV of the secondary transfer voltage depending on the electric resistance value different depending on the kind of the recording material S, the transfer current value in the surface of the chart can be changed from a low current value range to a high current value range. By this, on the basis of the transfer property of the patch, it becomes possible to select the optimum set value of the secondary transfer voltage.

The operation in the adjusting mode in this embodiment will be further described. FIG. 9 is a flowchart showing an outline of a procedure of the operation in the adjustment mode in this embodiment. Further, FIG. 10 is a graph for illustrating a calculating method of the secondary transfer voltage applied during output of the chart in the operation in the adjusting mode. Further, FIG. 11 is a graph for illustrating the switching width of the secondary transfer voltage applied during the output of the chart in the operation in the adjusting mode. Further, FIG. 12 is a schematic view of an example of a setting screen (recording material setting screen) of the recording material S. Further, FIG. 13 is a schematic view showing an example of an adjusting screen 300 for making setting of the adjustment mode in this embodiment. Incidentally, in this embodiment, the case where the above-described large chart 100L is formed as the chart is described as an example. Further, in this embodiment, the case where the operator inputs an instruction from the operating portion 70 of the image forming apparatus 1 and executes the operation in the adjustment mode is described as an example. Further, for simplicity, the recording material on which the chart is formed is referred simply to as a "chart" in some instances.

First, a recording material setting screen 400 and an adjusting screen 300 will be described with reference to FIGS. 12 and 13. In this embodiment, the controller 30 (adjusting process portion 31*d*) causes a display portion 70*a* of the operating portion 70 to display the recording material setting screen 400 for setting the recording material S as shown in FIG. 12. In this recording material setting screen 400, it is possible to make setting for associating a name 401 (for example, "recording material 1", "recording material 2", . . . ) of the recording material S with information (kind, size, basis weight, or the like of the recording material S) 402 of the recording material S. Then, when an adjusting mode actuating button 403 provided corresponding to each recording material S is operated by the operator, the controller 30 (adjusting process portion 31*d*) causes the display portion 70*a* of the operating portion 70 to display the adjusting screen 300 for making setting in the operation in the adjusting mode as shown in FIG. 13. That is, in this embodiment, the controller 30 (adjusting process portion 31*d*) acquires the information on the recording material S in response to the operation of the above-described adjusting mode actuating button 403 by the operator, and then starts processing of the operation in the adjusting mode for adjusting the set value of the secondary transfer voltage in association with the information. Incidentally, the information on the recording material S may be set in association with the recording material cassette 91 in which the corresponding recording materials S are acquired, in place of or in addition to the name 401 of the recording material S.

The adjusting screen 300 shown in FIG. 13 has voltage setting portions 301 (301*a*, 301*b*) for setting the adjusting values of the secondary transfer voltage for the first side (front side) and the second side (back side) of the recording material S, respectively. In addition, this adjusting screen 300 has an output side selecting portion 302 for selecting whether to output the chart to one side of double (both) sides of the recording material S. Further, the adjusting screen 300 includes an output instructing portion (chart output button) 303 for providing an instruction to output the chart 100. Further, the adjusting screen 300 includes a decision portion 304 (OK button 304*a*, apply button 304*b* for deciding the setting and a cancel button 305 for canceling a change setting). The controller 30 (adjusting process portion 31*d*) is capable of acquiring pieces of information on various settings inputted in the operating portion 70 through the adjusting screen 300 and then is capable of storing the pieces of information in the storing portions (the RAM 33, the secondary transfer voltage storage/operation portion 31*f*, and the like) as needed.

In this embodiment, before the chart 100 is outputted, the adjusting value displayed at the voltage setting portion 301 indicates a center voltage value of the secondary transfer voltage during the formation of the chart 100. When the adjusting value of "0" is selected at the voltage setting portion 301 and the chart 100 is selected, the above-described center voltage value is set at a predetermined value (table value) set in advance for the recording material S currently selected. Incidentally, the adjusting value displayed at the voltage setting portion 301 may be capable of being changed by the operator. In that case, when an adjusting value other than "0" is selected, the above-described center voltage value may be changed with a predetermined adjusting amount ΔV for each adjusting value of one level. In this embodiment, the case where the adjusting value of "0" is selected, and the center voltage value is set as a table value is taken as an example. Further, the chart outputting button 303 is operated, whereby the chart 100 is outputted. Further, after the output of the chart 100, at the voltage setting portion 301, the recommended adjusting value of the secondary transfer voltage determined by the controller 30 (adjusting process portion 31*d*) on the basis of a reading result of the chart 100 by the reading portion 80 is displayed. Incidentally, this adjusting value displayed at the voltage setting portion 301 may be capable of being changed by the operator.

Next, the procedure of the operation in the adjustment mode will be described with reference to FIG. 9. First, the controller 30 (adjusting process portion 31*d*) acquires information (kind, size, print side (one-side or double-side) or the like) on the recording material S for which the operator intends to adjust the set value of the secondary transfer voltage, selected by the operator through the recording material setting screen 400 and the adjusting screen 300 (S201). In this embodiment, the case where output of a one-side chart is designated by using A3-size paper of about 70 g/m$^2$ in basis weight as the recording material S showing a general electric resistance value depending on a thickness is taken as an example. This recording material S is classified as "plain paper 1" (basis weight: 64-75 g/m$^2$) in terms of the kind of the recording material S in the image forming apparatus 1 of this embodiment. Further, in this embodiment, the case is irrespective of the thickness. A3-size synthetic paper is used as a recording material S higher in electric resistance value than the plain paper and output of the one-side chart is designated is taken as an example. This recording material S is classified as "synthetic paper" in terms of the kind of the recording material S in the image forming apparatus 1 of this embodiment.

Next, the controller 30 (adjusting process portion 31*d*) sets the switching width of the adjusting amount ΔV of the secondary transfer voltage for each patch depending on the kind of the recording material S selected in S201 (S202). In this embodiment, in the ROM 32 of the controller 30, the information showing the relationship between the kind of the recording material S and the switching width of the adjusting amount ΔV of the secondary transfer voltage is set in advance and is stored as the table data or the like. In this embodiment, in the information, the switching width of the adjusting amount ΔV of the secondary transfer voltage for the "plain paper 1" is set at 75 V. Further, in the information, the switching width of the adjusting amount ΔV of the secondary transfer voltage for the "synthetic paper" is set at 150 V. On the basis of the information, the controller 30 (adjusting process portion 31*d*) sets the switching width of the adjusting amount ΔV of the secondary transfer voltage for each patch corresponding to the kind of the recording material S selected in S201.

Then, the controller 30 (adjusting process portion 31*d*) starts an output operation of the chart 100 when the chart outputting button 303 is operated by the operator (S203). Then, the controller 30 (adjusting process portion 31*d*) executes the secondary transfer voltage control and acquires the voltage-current characteristic of the secondary transfer portion N2, and then calculates the normal secondary transfer voltage Vtr and the secondary transfer voltage Vtr applied to each patch (S204).

Here, a calculating method of the secondary transfer voltages Vtr in S204 will be specifically described with reference to FIG. 10. The controller 30 calculates a voltage value (for example, 2400 V) necessary to cause a target transfer current Itarget (for example, 37 μA) depending on a condition selected in S201, on the basis of the voltage-current characteristic of the secondary transfer portion N2 acquired by the secondary transfer voltage control. Further, the controller 30 makes reference to a recording material part voltage Vp (for example, 1500 V) from the table data. Then, the controller 30 acquires, as the normal secondary transfer voltage Vtr, a secondary transfer voltage Vtr (3900 V) which is obtained by Vb (2400 V)+Vp(1500 V)+ΔV(0 V) on condition that the adjusting amount ΔV is 0 V, and determines the secondary transfer voltage (3900 V) as a center voltage value (def). Further, the controller 30 calculates the secondary transfer voltage Vtr corresponding to each patch number by adding the adjusting amount ΔV set depending on the kind of the recording material S to or by subtracting the adjusting amount ΔV set depending on the kind of the recording material S from the center voltage value of 3900 V (def for the patch number of "0") acquired by the secondary transfer voltage control.

Then, the controller 30 (adjusting process portion 31*d*) outputs the chart 100 under application of the secondary transfer voltage Vtr while switching the secondary transfer voltage Vtr for each patch on the basis of the setting of the secondary transfer voltage Vtr acquired as described above (S205).

FIG. 11 is a graph showing the adjusting amount ΔV for each patch in the case where the switching width of the adjusting amount ΔV of the secondary transfer voltage is changed depending on the kind of the recording material S. In this embodiment, the adjusting amounts ΔV in the case of using the "synthetic paper" and in the case of using the "plain paper 1" lower in electric resistance value than the "synthetic paper" are shown in a comparison manner. The switching width of the adjusting amount ΔV for each patch in the case of using the "plain paper 1" is set at 75 V. Further, the switching width of the adjusting amount ΔV for each patch in the case of using the "synthetic paper" higher in electric resistance value than the "plain paper 1" is set at 150 V. Here, similarly as in the above-described example, the standard secondary transfer voltage Vtr is 3900 V. For example, in the case of using the "synthetic paper", for the patch with the patch number of "0", the normal secondary transfer voltage Vtr of 3900 V acquired by the secondary transfer voltage control in which the adjusting amount ΔV is ±0 V is applied. Further, for example, for the patch with the patch number of "+1", the secondary transfer voltage Vtr of 4050 V (=3900 V+150 V) is applied. Further, for example, for the patch with the patch number of "−1", the secondary transfer voltage Vtr of 3750 V (=3900 V−150 V) is applied. Thus, in the case of using the "synthetic paper", the patches with the patch numbers from −5 through 0 to +5 are transferred while switching the secondary transfer voltage with a switching width of 150 V/(one) level. On the other hand, in the case of using the "plain paper 1", the patches with the patch numbers from −5 through 0 to +5 are transferred while switching the secondary transfer voltage with a switching width of 75 V/(one) level.

Next, the controller 30 (adjusting processing portion 31*d*) acquires density information (brightness information) of the patch of the outputted chart 100 (S206). In this embodiment, the outputted chart 100 is set on the reading portion 80 (for example, the automatic original feeding device 81) by the operator, and is read by the reading portion 80. At this time, the controller 30 (adjusting process portion 31*d*) is capable of causing the operating portion 70 to display a message prompting the operator to set the chart 100 on the reading portion 80. Further, the controller 30 (adjusting process portion 31*d*) is capable of carrying out reading of the chart 100 by controlling the reading portion 80 in response to an instruction of a start of reading by the operator through a display screen of the operating portion 70 or through a start button provided on the operating portion 70. Further, in this embodiment, the controller 30 (adjusting process portion 31*d*) acquires density data of patches of the solid blue (secondary color), the solid black (single color), and the half-tone black (gray) on the basis of a reading result of the reading portion 80 (S207). For example, as regards the solid blue patch (secondary color patch), data as shown in FIG. 14 is acquired. In FIG. 14, the abscissa represents the adjusting values (−5 through 0 to +5) showing associated voltage levels and the ordinate represents the average brightness of the solid blue patch. Incidentally, as regards the patch for the solid blue, brightness data for B is used. That is, RGB brightness data (8 bit) for each solid blue patch is acquired, and an average of brightness of each patch ("average brightness value") is acquired using the acquired brightness data (density data). Incidentally, the brightness data may be acquired using another secondary color of red or green instead of blue.

Next, on the basis of the acquired density data, the controller 30 (adjusting process portion 31*d*) acquires patches with an optimum transfer property (specifically, corresponding adjusting values (patch numbers) −5 through 0 to +5) and adjusting amounts ΔV corresponding to the patches, for example, in accordance with the following selection standard (S208). That is, from data acquired in S207, patches for which the solid blue density and the solid black density are stable are extracted. Further, the smallest adjusting value (the smallest voltage in absolute value) is selected from the extracted solid blue patches. The patches are outputted in a manner such that the secondary transfer voltage Vtr is changed to a weak (low) side and a strong (high) side with respect to the center voltage value (def) by the secondary transfer voltage control. At this time, when the secondary transfer voltage Vtr is lowered, at a portion where the toner amount is large as in the case of the solid blue patch, the toner in a sufficient amount cannot be transferred onto the recording material S, so that a transfer void image generates. Further, on the other hand, when the secondary transfer voltage Vtr is increased, at a portion where the toner amount is small as in the case of the half-tone patch, the toner polarity is partially reversed by the influence of the abnormal discharge on the toner, so that the toner is returned to the intermediary transfer belt 44*b* and thus a white dropout image generates. In this embodiment, in order to prevent the white dropout image at the above-described half-tone portion from generating, the set value of the secondary transfer voltage is automatically selected on the basis of the above-described selection standard.

Incidentally, the method of determining the recommended adjusting value of the secondary transfer voltage is not limited to the above-described method in this embodiment. For example, the adjusting value may be determined on the basis of extraction of the adjusting value at which the average brightness value is minimum (an average of the image density is maximum), or a representative value such as a center value of adjusting values for which the average brightness value is a predetermined value or less may be determined as the recommended adjusting value of the secondary transfer voltage. Further, the adjusting value may be determined on the basis of extraction of an adjusting value in a brightness stable region in which standard deviation of an average brightness successively acquired for a predetermined number of adjusting values becomes maximum or in a brightness stable region in which a difference in brightness between patches with adjacent adjusting values becomes a predetermined value or less. The recommended adjusting value of the secondary transfer voltage may only be required to be determined on the basis of information on a relationship between the secondary transfer voltage and the patch image density (brightness) during the patch formation.

Then, the controller 30 (adjusting process portion 31*d*) reflects the adjusting amount ΔV corresponding to the selected adjusting value in the set value of the secondary transfer voltage for the kind of the recording material S used for outputting the chart 100 (S209). Thereafter, in the case where the operator uses this kind of the recording material S, the adjusting amount ΔV corresponding to the selected adjusting value is reflected in the set value of the secondary transfer voltage. Incidentally, in this embodiment, the case where the one-side chart is outputted is taken as an example, so that the above-described adjusting value is reflected in printing of the front surface of the recording material of that kind. The set value reflected in printing of the back surface can be acquired through output of the double-side chart and reading thereof by the reading portion 80.

Further, at this time, the controller 30 (adjusting process portion 31*d*) causes the display portion 70*a* of the operating portion 70 to display the recommended adjusting value of the secondary transfer voltage determined as described above on the adjusting screen 300 as shown in FIG. 13. As described above, after the output of the chart 100, on the voltage setting portions 301 (301*a*, 301*b*), the recommended adjusting value of the secondary transfer voltage determined by the controller 30 is displayed. The operator is capable of discriminating whether or not the displayed adjusting value is appropriate on the basis of the display contents of the adjusting screen 300 and the outputted chart 100. The operator operates the decision portion 304 on the adjusting screen 300 as it is in the case where the displayed adjusting value is not changed. On the other hand, the operator inputs a desired adjusting value to the voltage setting portion 301 (301*a*, 301*b*) of the adjusting screen 300 in the case where the operator intends to change the adjusting value from the displayed adjusting value, and then operates the decision portion button 304. The controller 30 (adjusting process portion 31*d*) causes the RAM 33 (or the secondary transfer voltage storage/operation portion 31*f*) to store the adjusting value selected when the decision portion 304 is operated by the operator. Then, during execution of subsequent job in which the recording material S to be subjected to the above-described adjustment is used, the controller 30 (secondary transfer voltage storage operation portion 31*f*) sets the secondary transfer voltage depending on the adjusting value stored as described above until the adjustment is subsequently executed. That is, the controller 30 (secondary transfer voltage storage/operation portion 31*f*) sets the secondary transfer voltage for the image formation on the basis of the information on the recording material S used during the image formation and the information, corresponding to this information, stored in the above-described storing portion (RAM 33 or secondary transfer voltage storage/operation portion 31*f*). In this embodiment, the controller 30 (secondary transfer voltage storage/operation portion 31*f*) can calculate the adjusting value ΔV by multiplying the selected adjusting value described above by the switching width (75 V or 150 V) of the adjusting amount ΔV depending on the corresponding kind of the recording material S. Then, the controller 30 (secondary transfer voltage storage/operation portion 31*f*) can calculate the recording material part voltage Vp+ΔV after the adjustment by using the calculated adjusting value ΔV, and calculates a secondary transfer voltage Vtr (=Vb+Vp+ΔV) for normal image formation by using this recording material part voltage (Vp+ΔV). Incidentally, in the operation in the adjusting mode, either of the adjusting value and the adjusting amount ΔV acquired as described above may be stored.

Incidentally, in this embodiment, the operation in the simple adjusting mode (semiautomatic adjusting mode) using the reading portion 80 was described. However, a similar effect can be obtained also in the operation of the adjusting mode in which the optimum adjusting amount ΔV corresponding to the patch with the optimum transfer property in the outputted chart is selected by discrimination through eye observation.

Further, in the above-described embodiment, as the reading means, the reading portion 80 for reading the chart 100 set by the operator as shown in FIG. 1 was used, but the present invention is not limited to such an embodiment. As the reading means, a reading portion for reading the chart 100 when the chart 100 is outputted from the image forming apparatus 1 may be used. For example, as shown in FIG. 15, an in-line image sensor 86 may be provided on a side downstream of the fixing portion 46 with respect to the feeding direction of the recording material S. In this case, when the chart 100 is outputted from the image forming apparatus 1, the chart 100 is read by this image sensor 86, so that density information (brightness information) of the patch can be acquired.

Thus, the reading means may acquire the information on the density of the test image of the chart 100 on the recording material S outputted from the image forming apparatus 1. Or, the reading means may also acquire the information on the density of the test image of the chart 100 on the recording material S when the recording material S on which the chart 100 is formed is outputted from the image forming apparatus 1.

Further, in this embodiment, description was made using, as an example, the "synthetic paper" as special paper relatively high in electric resistance value classified by information on the recording material S other than the thickness, but the present invention is not limited thereto. As the special paper relatively high in electric resistance value, in addition to the synthetic paper, it is possible to cite "label paper", an "envelope", and the like. Here, the "synthetic paper" is a recording material S manufactured by using a synthetic resin material (such as PET) as a main raw material, and may have an outer appearance similar to another appearance of wood pulp paper (including waste paper) and may also be a so-called resin film-like paper. Further, the "label paper" is a recording material including an adhesive layer between a label layer formed of the wood pulp paper (including waste paper) and a pasteboard layer. Further, as special paper classified by the information on the recording material S other than the thickness and relatively low in electric resistance value, it is possible to cite "vapor deposition paper". In this case, contrary to the case of the "synthetic paper" in this embodiment, the switching width of the adjusting amount ΔV of the secondary transfer voltage can be made smaller than the case of the "plain paper". Here, the "vapor deposition paper" is a recording material which is provided by vapor deposition or the like of a metal layer on the surface of a base material formed at the wood pulp paper (including waste paper) and to which a metallic tone decoration effect is imparted.

Thus, the image forming apparatus 1 of this embodiment includes the image bearing member 44*b* for bearing the toner image, the transfer member 45 for forming the transfer portion N2 where the toner image is transferred from the image bearing member 44*b* onto the recording material S, the applying portion 76 for applying the voltage to the transfer member 45, the executing portion (in this embodiment, the controller 30 has the function of the executing portion) for executing the output operation in which the chart 100 prepared by transferring the plurality of test images onto the recording material S under application of the plurality of test voltages to the transfer member 45*b* by the applying portion 76 is formed and outputted and in which the chart 100 is formed by changing the test voltage so as to increase or decrease the absolute value of the test voltage stepwise, and the acquiring portion 70 for acquiring the kind information relating to the kind of the recording material S forming the chart 100 and classified by the information other than the thickness of the recording material S, wherein the executing portion 30 is capable of changing the change width per level of the above-described test voltage on the basis of the kind information. The executing portion 30 is capable of changing the above-described change width so that the change width is a first change width in the case where the electric resistance value of the recording material S indicated by the kind information is a first value and so that the change width is a second change width larger than the first change width in the case where the electric resistance value of the recording material S indicated by the kind information is a second value higher than the first value. Further, the executing portion 30 is capable of changing the change width so that the change width is the first change width in the case where the recording material S indicated by the kind information is the plain paper and so that the change width is the second change width larger than the first change width in the case where the recording material S indicated by the kind information is the synthetic paper. Further, the executing portion 30 is capable of changing the change width so that the change width is the first change width in the case where the recording material S indicated by the kind information is the plain paper and so that the change width is the second change width smaller than the first change width in the case where the recording material S indicated by the kind information is the vapor deposition paper. Incidentally, in this embodiment, the kind information shows a category of the recording material S. Further, in this embodiment, the image bearing member 44*b* is the intermediary transfer member for conveying the toner image, transferred from another image bearing member 51, onto the recording material S in the transfer portion N2. Further, in this embodiment, the image forming apparatus 1 includes the reading means 80 for acquiring the information on the density of the test image on the chart 100, and the control means 30 for outputting the information on the adjusting amount of the transfer voltage on the basis of the information on the density of the test image on the chart 100 acquired by the reading means 80.

As described above, in the operation in the adjusting mode, depending on the electric resistance value different depending on the kind of the recording material S, the switching width of the adjusting amount ΔV of the secondary transfer voltage for each patch is changed. By this, irrespective of the electric resistance value of the recording material S, the transfer current value is in the appropriate detection range from the side where the transfer property is low to the side where the transfer property is high. For that reason, in the operation in the adjusting portion, it becomes possible to select the optimum adjusting amount ΔV of the secondary transfer voltage. Accordingly, according to this embodiment, irrespective of the recording material used for outputting the chart, it becomes possible to set the appropriate transfer voltage by changing the transfer current value in the appropriate range in the chart.

Embodiment 2

Next, another embodiment of the present invention will be described. The basic structure and operation of an image forming apparatus of this embodiment are the same as those of the image forming apparatus of the embodiment 1. Therefore, as to the image forming apparatus of this embodiment, elements including the same or corresponding functions or structures as those of the image forming apparatus of the embodiment 1 are denoted by the same reference numerals or symbols as those of the embodiment 1, and detailed description thereof will be omitted.

In the embodiment 1, the kind of the recording material S such as the plain paper, the thick paper, or the synthetic paper was designated, and the switching width of the adjusting amount ΔV depending on the kind of the recording material S was set. On the other hand, in this embodiment, brands (including manufacturers, trade names, model names, and the like) intrinsic to the recording material S, such as "CS-068" (plain paper), "GF-C157" (thick paper), and specific brands of other special papers are designated. Then, in that case, the switching width of the adjusting amount ΔV of the secondary transfer voltage is changed on the basis of the information on the electric resistance value stored in association with the brand of the recording material S. Thus, in this embodiment, the kind information indicates the brand of the recording material S.

This is because even in the same classification of the kind of the recording material S, depending on the brand of the recording material S, the electric resistance value is low or high in some cases. The switching width of the adjusting amount ΔV of the secondary transfer voltage is changed by directly designating the brand of the recording material S, so that it becomes possible to set the optimum switching width of the adjusting amount ΔV of the secondary transfer voltage in the case where the electric resistance value is different even in the same classification of the kind of the recording material S.

FIG. 16 is a flowchart showing an outline of a procedure of an operation in an adjusting mode in this embodiment.

Processes S301 to S309 in FIG. 16 are similar to S201 to S209 in FIG. 9 described in the embodiment 1. However, in this embodiment, in S301, the brand, the size, the print side (one-side or double-sides), or the like is selected through the adjusting screen on the operating portion 70. Further, in this embodiment, in the ROM 32 of the controller 30, information showing a relationship between the brand of the recording material S and the switching width of the adjusting amount ΔV of the secondary transfer voltage is set in advance and then is stored. Then, in this embodiment, on the basis of this information, the switching width of the secondary transfer voltage for each patch corresponding to the brand of the recording material S selected in S302 is set.

As described above, in the operation in the adjusting mode, depending on the electric resistance value different depending on the brand of the recording material S, the switching width of the adjusting amount ΔV of the secondary transfer voltage for each patch is changed. By this, irrespective of the electric resistance value of the recording material S intrinsic to the brand of the recording material S, the transfer current value is in the appropriate detection range from the side where the transfer property is low to the side where the transfer property is high. For that reason, in the operation in the adjusting portion, it becomes possible to select the optimum adjusting amount ΔV of the secondary transfer voltage. Accordingly, according to this embodiment, irrespective of the recording material used for outputting the chart, it becomes possible to set the appropriate transfer voltage by changing the transfer current value in the appropriate range in the chart.

OTHER EMBODIMENTS

As described above, the present invention was described based on specific embodiments, but is not limited to the above-described embodiments.

Further, in the above-described embodiments, the transfer voltage was adjusted by using the adjusting value corresponding to the predetermined adjusting value, but the adjusting value may also be directly set through the adjusting screen, for example.

Further, in the above-described embodiments, the image forming apparatus has the constitution in which the information on the adjusting amount of the transfer voltage determined by the image forming apparatus in the operation in the adjustment mode can be changed by the operator, but may employ a constitution in which such information cannot be changed.

Further, in the above-described embodiments, the operation performed at the operating portion of the image forming apparatus can also be performed by the external device. That is, the case where the operation in the adjustment mode is executed by the operation through the operating portion 70 of the image forming apparatus 1 by the operator was described, but the operation in the adjustment mode may also be executed by the operation through the external device 200 such as the personal computer. In this case, setting similar to the setting in the above-described embodiments can be made through a screen displayed on the display portion of the external device 200 by a driver program for the image forming apparatus 1 installed in the external device 200.

Further, in the above-described embodiments, the constitution in which the secondary transfer voltage was subjected to the constant-voltage control was described, but the secondary transfer voltage may also be subjected to the constant-current control. In the above-described embodiments, in the constitution in which the secondary transfer voltage was subjected to the constant-voltage control, the secondary transfer voltage was adjusted by adjusting the target voltage under application of the secondary transfer voltage in the operation in the adjustment mode. In the case of a constitution in which the secondary transfer voltage is subjected to constant current control, the secondary transfer voltage can be adjusted by adjusting the target current under application of the secondary transfer voltage in the operation of the adjusting mode.

Further, each of the current detection result and the voltage detection result may be an average of a plurality of sampling values acquired in a predetermined sampling interval at a certain detection timing. Further, in the case where the transfer voltage is subjected to the constant-voltage control, the voltage value may be detected (recognized) from an output instruction value to the power source. In the case where the transfer voltage is subjected to the constant-current control, the current value may be detected (recognized) from the output instruction to the power source.

Further, the present invention is not limited to the image forming apparatus of the tandem type, but is also applicable to image forming apparatuses other types. In addition, the image forming apparatus is not limited to the color image forming apparatus, but may also be a monochromatic image forming apparatus. For example, the present invention may be applied to a transfer portion in the image forming apparatus having a constitution in which the toner image is formed on the photosensitive drum as the image bearing member and then is directly transferred onto the recording material in the transfer portion. Further, the present invention can be carried out in various uses, such as printers, various printing machines, copying machines, facsimile machines, and multi-function machines.

According to the present invention, irrespective of the recording material used for outputting the chart, it becomes possible to set an appropriate transfer voltage by changing a transfer current value in an appropriate range in the chart.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-173542 filed on Oct. 22, 2021, which is hereby incorporated by reference herein in its entirety.

What is claimed is:

1. An image forming apparatus comprising:
- an image bearing member configured to bear a toner image;
- an image forming portion configured to form the toner image on the image bearing member;
- a transfer member configured to form a transfer portion where the toner image is transferred from the image bearing member onto a recording material;
- an applying portion configured to apply a voltage to the transfer member; and
- an executing portion configured to execute an output operation for forming and outputting a chart formed on a recording material on which a plurality of test images are transferred by applying a plurality of test voltages to the transfer member by the applying portion,
- wherein the executing portion changes a difference between a maximum value and a minimum value of the plurality of test voltages based on a kind of the recording material on which the chart is formed.

2. The image forming apparatus according to claim 1, wherein the difference is a first difference in a case in which an electric resistance of the recording material on which the chart is formed is a first value and the difference is a second difference greater than the first difference in a case in which an electric resistance of the recording material on which the chart is formed is a second value higher than the first value.

3. The image forming apparatus according to claim 1, wherein the difference is a first difference in a case in which the recording material on which the chart is formed is plain paper and the difference is a second difference greater than the first difference in a case in which the recording material on which the chart is formed is synthetic paper.

4. The image forming apparatus according to claim 1, wherein the difference is a first difference in a case in which the recording material on which the chart is formed is plain paper and the difference is a second difference less than the first difference in a case in which the recording material on which the chart is formed is vapor deposition paper.

5. The image forming apparatus according to claim 1, wherein the image bearing member is an intermediary transfer member configured to convey the toner image, transferred from another image bearing member, so as to transfer the toner image to the recording material at the transfer portion.

6. The image forming apparatus according to claim 1, further comprising:
- reading means configured to acquire information on a density of the test image of the chart; and
- a controller configured to adjust the transfer voltage based on the information on the density of the test image of the chart acquired by the reading means.

7. The image forming apparatus according to claim 1, wherein the output operation is executed during non-image formation, and
- wherein the voltage applied to the transfer member is subjected to constant voltage control during image formation in which the toner image is transferred to the recording material.

8. An image forming apparatus comprising:
- an image bearing member configured to bear a toner image;

an image forming portion configured to form the toner image on the image bearing member;

a transfer member configured to form a transfer portion where the toner image is transferred from the image bearing member onto a recording material;

an applying portion configured to apply a voltage to the transfer member; and an executing portion configured to execute an output operation for forming and outputting a chart formed on a recording material on which a plurality of test images are transferred by applying a plurality of test voltages to the transfer member by the applying portion, wherein the plurality of test voltages include a first test voltage of a first voltage level and a second test voltage of a second voltage level higher than the first voltage level, and wherein the executing portion changes a difference between the first voltage level and the second voltage level based on a kind of the recording material on which the chart is formed.

9. The image forming apparatus according to claim 8, wherein the difference is a first difference in a case in which an electric resistance of the recording material on which the chart is formed is a first value and the difference is a second difference greater than the first difference in a case in which an electric resistance of the recording material on which the chart is formed is a second value higher than the first value.

10. The image forming apparatus according to claim 8, wherein the difference is a first difference in a case in which the recording material on which the chart is formed is plain paper and the difference is a second difference greater than the first difference in a case in which the recording material on which the chart is formed is synthetic paper.

11. The image forming apparatus according to claim 8, wherein the difference is a first difference in a case in which the recording material on which the chart is formed is plain paper and the difference is a second difference less than the first difference in a case in which the recording material on which the chart is formed is vapor deposition paper.

12. The image forming apparatus according to claim 8, wherein the image bearing member is an intermediary transfer member configured to convey the toner image, transferred from another image bearing member, so as to transfer the recording material at the transfer portion.

13. The image forming apparatus according to claim 8, further comprising:

reading means configured to acquire information on a density of the test image of the chart; and a controller configured to adjust the transfer voltage based on the information on the density of the test image of the chart acquired by the reading means.

14. The image forming apparatus according to claim 8, wherein the output operation is executed during non-image formation, and wherein the voltage applied to the transfer member is subjected to constant voltage control during image formation in which the toner image is transferred to the recording material.

* * * * *